United States Patent
Kim et al.

(10) Patent No.: US 10,560,833 B2
(45) Date of Patent: Feb. 11, 2020

(54) METHOD AND DEVICE FOR EXCHANGING FRAMES FOR PROXY SERVICE IN WIRELESS COMMUNICATION SYSTEM

(71) Applicant: LG ELECTRONICS INC., Seoul (KR)

(72) Inventors: Dongcheol Kim, Seoul (KR);
Byungjoo Lee, Seoul (KR); Hyunhee Park, Seoul (KR); Giwon Park, Seoul (KR); Youngjun Jo, Seoul (KR);
Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 15/745,360

(22) PCT Filed: Jul. 15, 2016

(86) PCT No.: PCT/KR2016/007741
§ 371 (c)(1),
(2) Date: Jan. 16, 2018

(87) PCT Pub. No.: WO2017/010843
PCT Pub. Date: Jan. 19, 2017

(65) Prior Publication Data
US 2018/0213388 A1    Jul. 26, 2018

Related U.S. Application Data

(60) Provisional application No. 62/193,583, filed on Jul. 16, 2015, provisional application No. 62/258,551, filed on Nov. 23, 2015.

(51) Int. Cl.
*H04W 8/00* (2009.01)
*H04W 84/12* (2009.01)
*H04W 88/18* (2009.01)

(52) U.S. Cl.
CPC ........... *H04W 8/005* (2013.01); *H04W 84/12* (2013.01); *H04W 88/182* (2013.01)

(58) Field of Classification Search
None
See application file for complete search history.

(56) References Cited

U.S. PATENT DOCUMENTS

2012/0243524 A1* 9/2012 Verma ................... H04W 48/16
370/338
2013/0288668 A1* 10/2013 Pragada ................ H04W 12/06
455/426.1
(Continued)

FOREIGN PATENT DOCUMENTS

| WO | 2011062404 | 5/2011 |
|---|---|---|
| WO | 2012060611 | 5/2012 |
| WO | 2013073914 | 5/2013 |

OTHER PUBLICATIONS

Yong et al., "Neighbor Awareness Networking Service Discovery Proxy", U.S. Appl. No. 62/130,246, filed Mar. 9, 2015 (Year: 2015).*

(Continued)

*Primary Examiner* — Gregory B Sefcheck
*Assistant Examiner* — Jenkey Van
(74) *Attorney, Agent, or Firm* — Lee Hong Degerman Kang Waimey

(57) ABSTRACT

In the present specification, a method may be provided in which a NAN terminal exchanges frames in a wireless communication system. Here, the method in which a NAN terminal exchanges frames may include the steps of: transmitting a first frame, in which a first NAN terminal requests first properties information, to a second NAN terminal, and receiving a second frame for the first properties information from the second NAN terminal. Here, when the first frame is a service discovery frame, the first properties information
(Continued)

may be set on the basis of a first field value of the first frame, and when the first frame is a GAS frame, the first properties information may be set as proxy service information.

13 Claims, 14 Drawing Sheets

(56) References Cited

U.S. PATENT DOCUMENTS

| | | | |
|---|---|---|---|
| 2014/0313936 A1* | 10/2014 | You | H04L 67/16 370/254 |
| 2015/0003327 A1* | 1/2015 | Seok | H04W 4/06 370/328 |
| 2015/0172901 A1 | 6/2015 | Kasslin et al. | |
| 2016/0057237 A1* | 2/2016 | Yang | H04L 67/16 709/224 |
| 2016/0270137 A1* | 9/2016 | Yong | H04W 8/005 |
| 2016/0278112 A1* | 9/2016 | Liu | H04W 8/005 |
| 2016/0352782 A1* | 12/2016 | Patil | H04L 65/105 |
| 2016/0353269 A1* | 12/2016 | Kasslin | H04W 8/005 |

OTHER PUBLICATIONS

Liu et al. "Neighbor Awareness Networking Datapath", U.S. Appl. No. 62/150,187, filed Apr. 20, 2015 (Year: 2015).*

PCT International Application No. PCT/KR2016/007741, Written Opinion of the International Searching Authority dated Oct. 25, 2016, 19 pages.

\* cited by examiner

METHOD AND DEVICE FOR EXCHANGING FRAMES FOR PROXY SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2016/007741, filed on Jul. 15, 2016, which claims the benefit of U.S. Provisional Application Nos. 62/193,583, filed on Jul. 16, 2015, and 62/258,551, filed on Nov. 23, 2015, the contents of which are all hereby incorporated by reference herein in their entirety.

TECHNICAL FIELD

The present specification relates to a wireless communication system, and more particularly, to a method of exchanging a frame for a proxy service in a wireless communication system and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

DISCLOSURE OF THE INVENTION

Technical Tasks

A technical task of the present specification is to provide a method of exchanging a frame for a NAN (neighbor awareness networking) proxy service in a wireless communication system and an apparatus therefor.

Another technical task of the present specification is to provide a method of configuring a protocol and a frame used for a NAN proxy service procedure in a wireless communication system.

Another technical task of the present specification is to provide a method of performing a NAN proxy service in consideration of backward compatibility with a different system.

The other technical task of the present specification is to provide a method of configuring a protocol and a frame for identifying a NAN proxy service.

Technical Solution

According to one embodiment of the present invention, it is able to provide a method for a NAN (neighbor awareness networking) terminal to exchange a frame in a wireless communication system. In this case, a method of exchanging a frame, which is exchanged by the NAN terminal in a wireless communication system, includes the steps of transmitting, by a first NAN terminal, a first frame for requesting first attribute information to a second NAN terminal and receiving a second frame for the first attribute information from the second NAN terminal. In this case, if the first frame corresponds to a service discovery frame, the first attribute information is configured based on a first field value of the first frame. If the first frame corresponds to a GAS (generic advertisement service) frame, the first attribute information can be configured by proxy service information.

To further achieve these and other advantages and in accordance with the purpose of the present invention, according to a different embodiment, a first NAN terminal exchanging a frame in a wireless communication system includes a reception module configured to receive information from an external device, a transmission module configured to transmit information to the external device, and a processor configured to control the reception module and the transmission module, the processor configured to control the transmission module to transmit a first frame for requesting first attribute information to a second NAN terminal, the processor configured to control the reception module to receive a second frame for the first attribute information from the second NAN terminal. In this case, if the first frame corresponds to a service discovery frame, the first attribute information is configured based on a first field value of the first frame. If the first frame corresponds to a GAS (generic advertisement service) frame, the first attribute information can be configured by proxy service information.

Following items can be commonly applied to a method of exchanging a frame for a proxy service in a wireless communication system and an apparatus therefor.

According to one embodiment of the present invention, if the first frame corresponds to the GAS frame, the first attribute information can be configured by the proxy service information irrespective of the first field value.

According to one embodiment of the present invention, if the first frame corresponds to the GAS frame, the first frame is configured by a GAS initial request frame format and the second frame can be configured by a GAS initial response frame format.

According to one embodiment of the present invention, the proxy service information may correspond to one selected from the group consisting of proxy service discovery information, proxy service registration information, proxy service deregistration information, proxy service update information, proxy service notification information, and proxy service delegation result request information.

In this case, according to one embodiment of the present invention, the first NAN terminal may correspond to a NAN proxy client terminal and the second NAN terminal may correspond to a NAN proxy server terminal.

In this case, according to one embodiment of the present invention, if the first NAN terminal and the second NAN terminal exchange the proxy service discovery information with each other among the proxy services, the first frame is configured by the service discovery frame and the first field value can be configured by a value indicating the proxy services.

In this case, according to one embodiment of the present invention, if the first NAN terminal and the second NAN terminal complete proxy service discovery, the proxy service information can be exchanged by the GAS frame only.

According to one embodiment of the present invention, the first field of the first frame may correspond to a NAN attribute field.

Advantageous Effects

According to the present specification, it is able to provide a method of exchanging a frame for a NAN (neighbor awareness networking) proxy service in a wireless communication system and an apparatus therefor.

According to the present specification, it is able to provide a method of configuring a protocol and a frame used for a NAN proxy service procedure in a wireless communication system.

According to the present specification, it is able to provide a method of performing a NAN proxy service in consideration of backward compatibility with a different system.

According to the present specification, it is able to provide a method of configuring a protocol and a frame for identifying a NAN proxy service.

Effects obtainable from the present specification may be non-limited by the above mentioned effect. And, other unmentioned effects can be clearly understood from the following description by those having ordinary skill in the technical field to which the present invention pertains.

DESCRIPTION OF DRAWINGS

FIG. 8 is a diagram illustrating a discovery window, and the like;

BEST MODE

Mode for Invention

Figure 1:
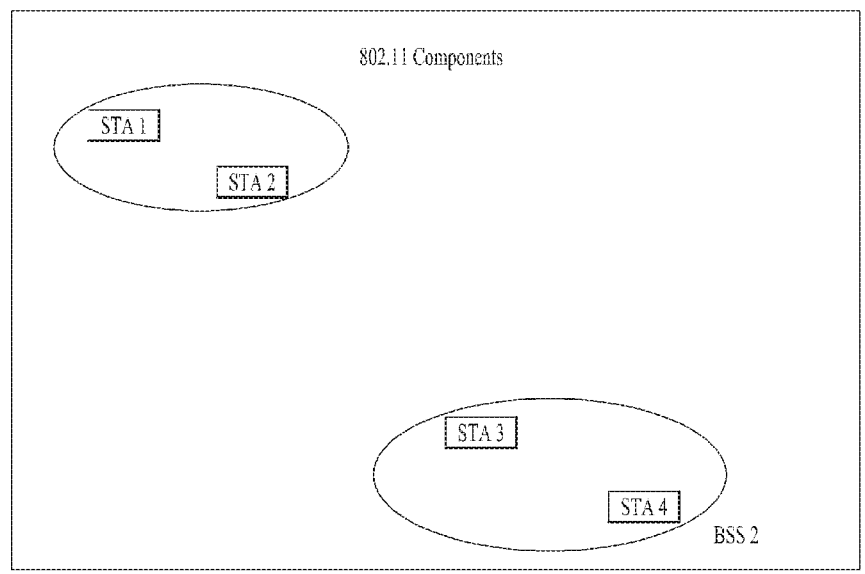
FIG. 1 is a diagram for an example of a structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
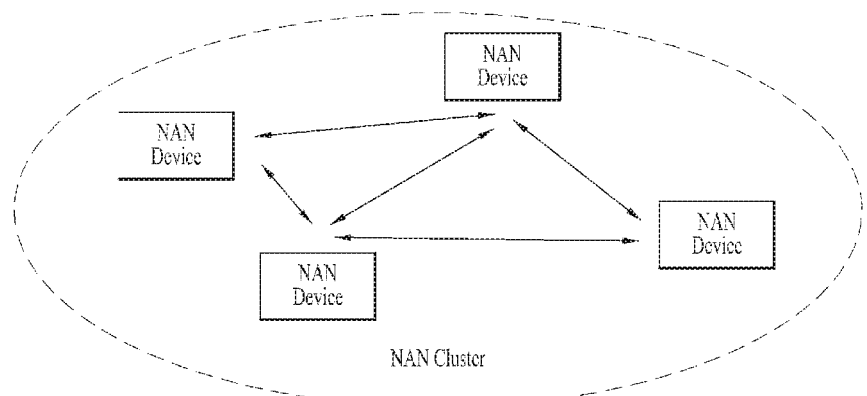
FIGS. 2 to 3 are diagrams for examples of a NAN cluster.
Figure 3:
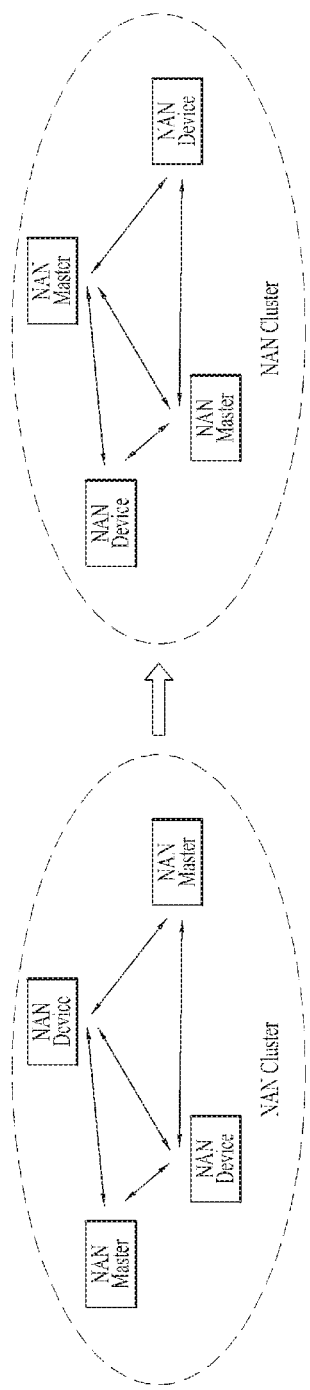

A NAN network can be constructed with NAN devices (devices) that use a set of identical NAN parameters (e.g., a time interval between consecutive discovery windows, an interval of a discovery window, a beacon interval, a NAN channel, etc.). A NAN cluster can be formed by NAN devices and the NAN cluster means a set of NAN devices that are synchronized on the same discovery window schedule. And, a set of the same NAN parameters is used in the NAN cluster. FIG. 2 illustrates an example of the NAN cluster. A NAN device included in the NAN cluster may directly transmit a multicast/unicast service discovery frame to a different NAN device within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
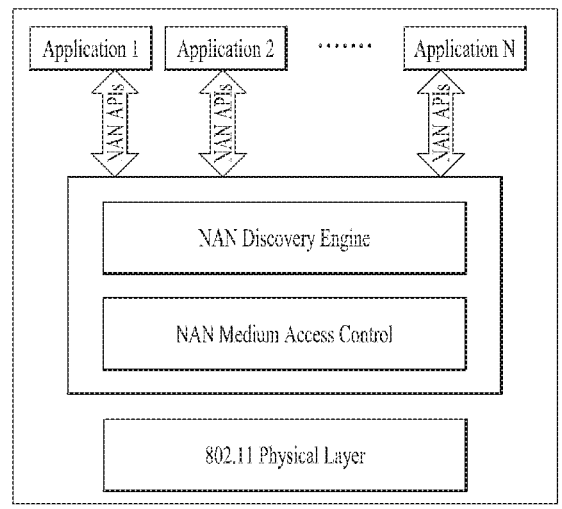
FIG. 4 is a diagram for an example of a structure of a NAN terminal.

FIG. 4 illustrates an example of a structure of a NAN device (device). Referring to FIG. 4, the NAN device is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
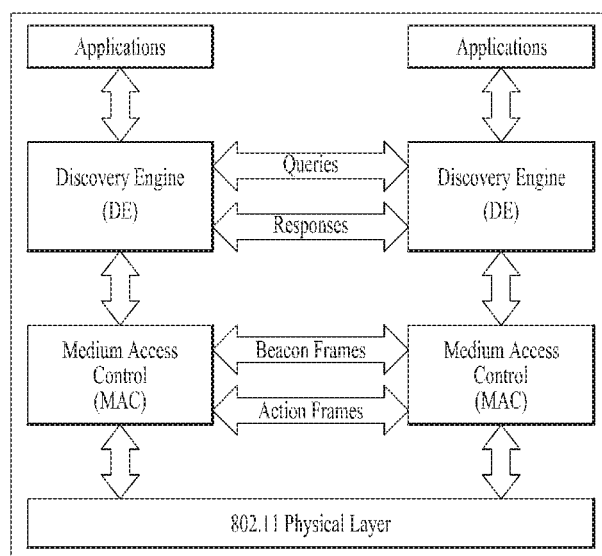
FIGS. 5 to 6 are diagrams illustrating a relation between NAN components.
Figure 6:
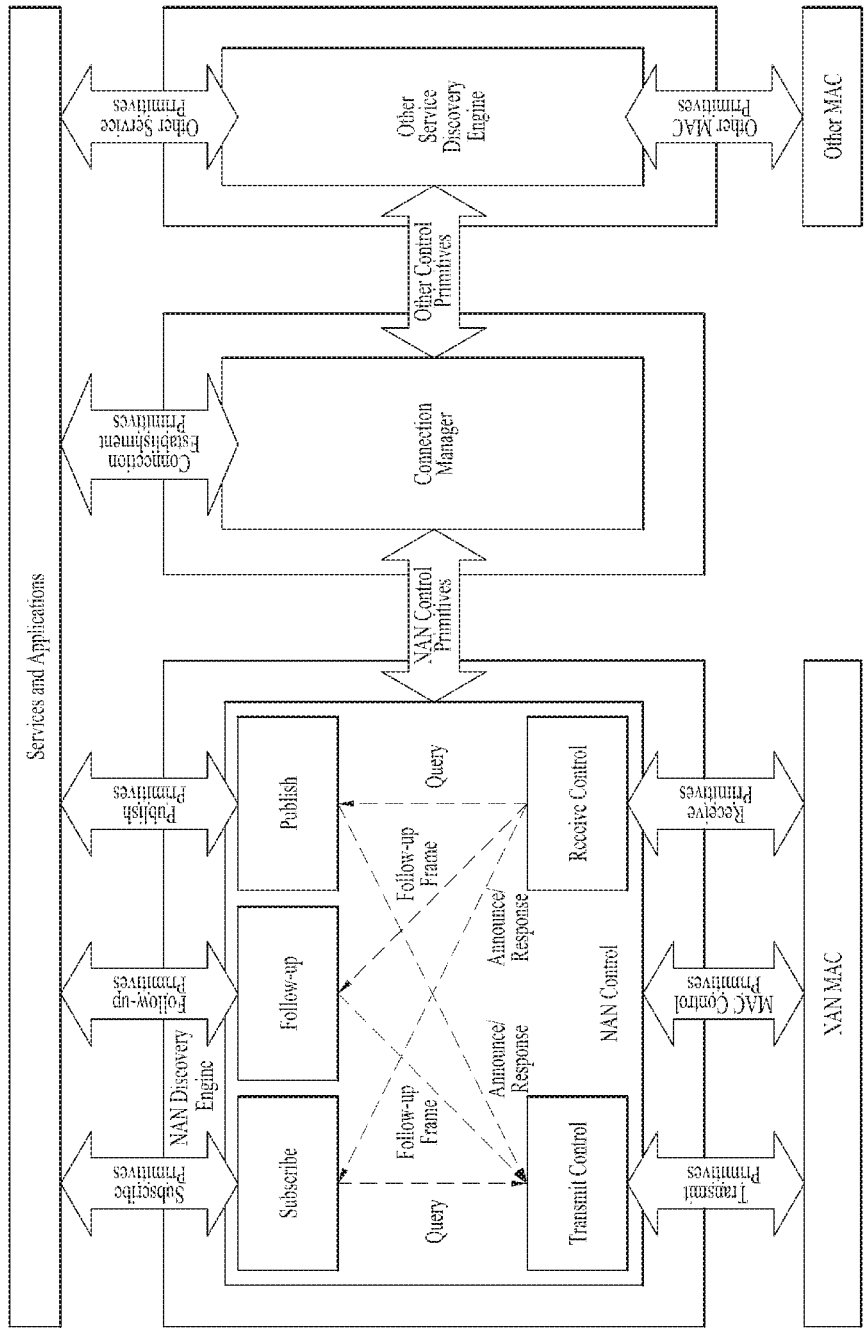

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
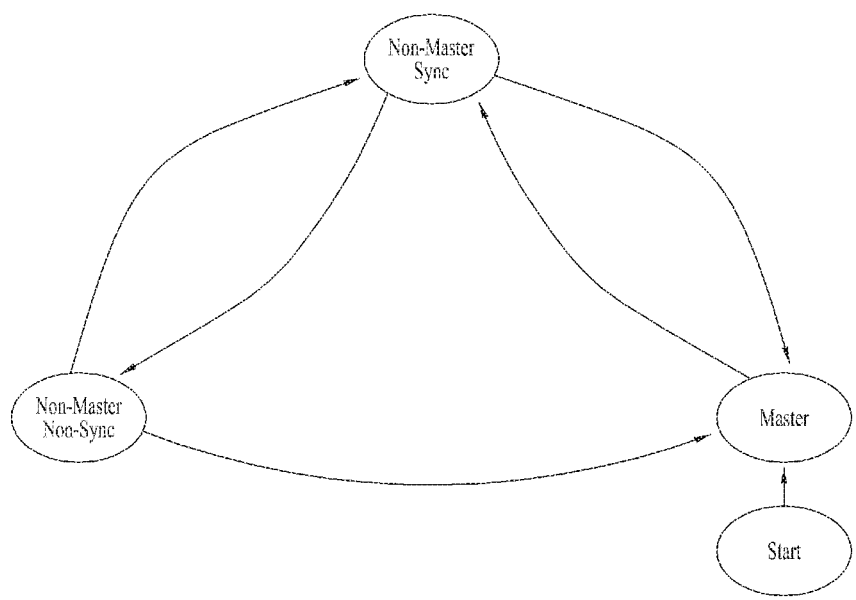
FIG. 7 is a diagram illustrating a state transition of a NAN terminal.

As mentioned in the foregoing description, a NAN device (device) can serve as a NAN master and the NAN master can be changed. In other words, roles and states of the NAN device can be shifted in various ways and related examples are illustrated in FIG. 7. The roles and states, which the NAN device can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1

TABLE 1

| Role and State | Discovery Beacon | Synchronization Beacon |
|---|---|---|
| Master | Transmission Possible | Transmission Possible |
| Non-Master Sync | Transmission Impossible | Transmission Possible |
| Non-Master Non-Sync | Transmission Impossible | Transmission Impossible |

The state of the NAN device can be determined according to a master rank (MR). The master rank indicates the preference of the NAN device to serve as the NAN master. In particular, a high master rank means strong preference for the NAN master. The NAN MR can be determined by Master Preference, Random Factor, Device MAC address, and the like according to Formula 1.

$$\text{Master Rank} = \text{Master Preference} * 2^{56} + \text{Random Factor} * 2^{48} + \text{MAC}[5] * 2^{40} + \ldots + \text{MAC}[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
|---|---|---|---|
| Attribute ID | 1 | 0x00 | Identifies the type of NAN attribute. |
| Length | 2 | 2 | Length of the following field in the attribute. |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN device that activates a NAN service and initiates a NAN cluster, each of the Master Preference and the Random Factor is set to 0 and NANWarmUp is reset. The NAN device should set a Master Preference field value in the master indication attribute to a value greater than 0 and a Random Factor value in the master indication attribute to a new value until when the NANWarmUp expires. When a NAN device joins a NAN cluster in which the Master Preference of an anchor master is set to a value greater than 0, the corresponding NAN device may set the Master Preference to a value greater than 0 and the Random Factor to a new value irrespective of expiration of the NANWarmUp.

Moreover, a NAN device can become an anchor master of a NAN cluster depending on an MR value. That is, all NAN devices have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN device becomes an anchor master of a currently existing NAN cluster, the NAN device adopts TSF used in the currently existing NAN cluster without any change.

The NAN device can become the anchor master in the following cases: if a new NAN cluster is initiated; if the master rank is changed (e.g., if an MR value of a different NAN device is changed or if an MR value of the anchor master is changed); or if a beacon frame of the current anchor master is not received any more. In addition, if the MR value of the different NAN device is changed or if the MR value of the anchor master is changed, the NAN device may lose the status of the anchor master. The anchor master can be determined according to an anchor master selection algorithm in the following description. In particular, the anchor master selection algorithm is the algorithm for determining which NAN device becomes the anchor master of the NAN cluster. And, when each NAN device joins the NAN cluster, the anchor master selection algorithm is driven.

If a NAN device initiates a new NAN cluster, the NAN device becomes the anchor master of the new NAN cluster. If a NAN synchronization beacon frame has a hop count in excess of a threshold, the NAN synchronization beacon frame is not used by NAN devices. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN device compares an anchor master rank value in the beacon frame with a stored anchor master rank value. If the stored anchor master rank value is greater than the anchor master value in the beacon frame, the NAN device discards the anchor master value in the beacon frame. If the stored anchor master value is less than the anchor master value in the beacon frame, the NAN device newly stores values greater by 1 than the anchor master rank and the hop count included in the beacon frame and an AMBTT value in the beacon frame. If the stored anchor master rank value is equal to the anchor master value in the beacon frame, the NAN device compares hop counters. Then, if a hop count value in the beacon frame is greater than a stored value, the NAN device discards the received beacon frame. If the hop count value in the beacon frame is equal to (the stored value−1) and if an AMBTT value is greater than the stored value, the NAN device newly stores the AMBTT value in the beacon frame. If the hop count value in the beacon frame is less than (the stored value−1), the NAN device increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN device exceeds the stored AMBTT value by more than 16*512 TUs (e.g., 16 DW periods), the NAN device may assume itself as an anchor master and then update an anchor master record. In addition, if any of MR related components (e.g., Master Preference, Random Factor, MAC Address, etc.) is changed, a NAN device not corresponding to the anchor master compares the changed MR with a stored value. If the changed MR of the NAN device is greater than the stored value, the corresponding NAN device may assume itself as the anchor master and then update the anchor master record.

Moreover, a NAN device may set anchor master fields of the cluster attributes in the NAN synchronization and discovery beacon frames to values in the anchor master record, except that the anchor master sets the AMBTT value to a TSF value of corresponding beacon transmission. The NAN device, which transmits the NAN synchronization beacon frame or the discovery beacon frame, may be confirmed that the TSF in the beacon frame is derived from the same anchor master included in the cluster attribute.

Moreover, a NAN device may adopt a TSF timer value in a NAN beacon received with the same cluster ID in the following case: i) if the NAN beacon indicates an anchor master rank higher than a value in an anchor master record of the NAN device; or ii) if the NAN beacon indicates an anchor master rank equal to the value in the anchor master record of the NAN device and if a hop count value and an AMBTT value in the NAN beacon frame are larger values in the anchor master record.

NAN Synchronization

NAN devices (devices) participating in the same NAN Cluster may be synchronized with respect to a common clock. A TSF in the NAN cluster can be implemented through a distributed algorithm that should be performed by all the NAN devices. Each of the NAN devices participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN devices may transmit synchronization beacon frames in order to help all NAN devices in the NAN cluster synchronize their own clocks.

NAN beacon transmission is distributed. A NAN beacon frame is transmitted during a DW period existing at every 512 TU. All NAN devices can participate in generation and transmission of the NAN beacon according to their roles and states. Each of the NAN devices should maintain its own TSF timer used for NAN beacon period timing. A NAN synchronization beacon interval can be established by the NAN device that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
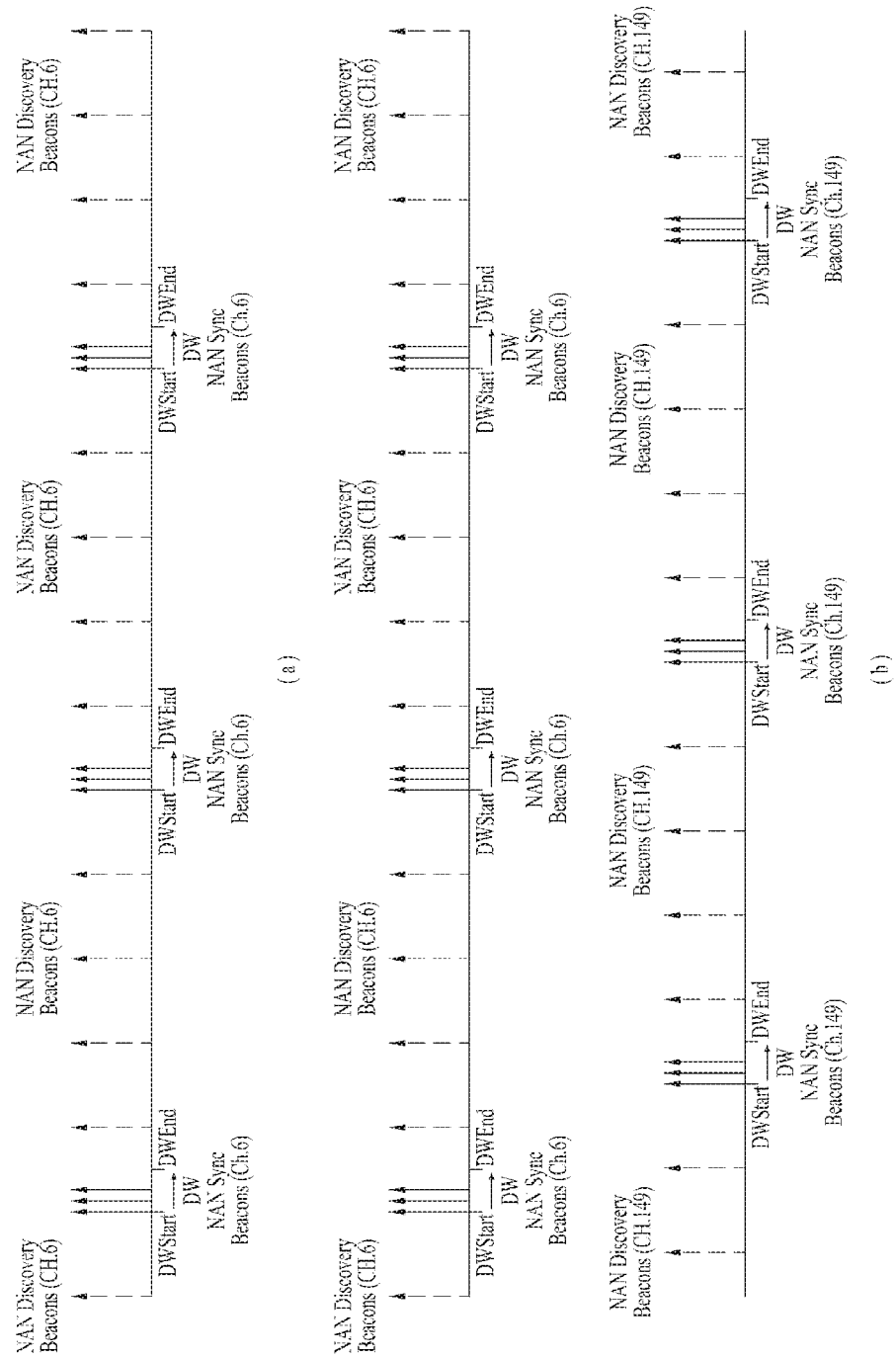

Each NAN device serving as a NAN master transmits a NAN discovery beacon frame from out of a NAN discovery window. On average, the NAN device serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN device participates, the NAN device serving as the NAN master is able to omit transmission of the NAN discovery beacon frame. In order to minimize power required to transmit the NAN discovery beacon frame, the NAN device serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (a) shows transmission of NAN discovery and synchronization beacon frames of a NAN device operating in 2.4 GHz band. FIG. 8 (b) shows transmission of NAN discovery and synchronization beacon frames of a NAN device operating in 2.4 GHz and 5 GHz bands.

Figure 9:
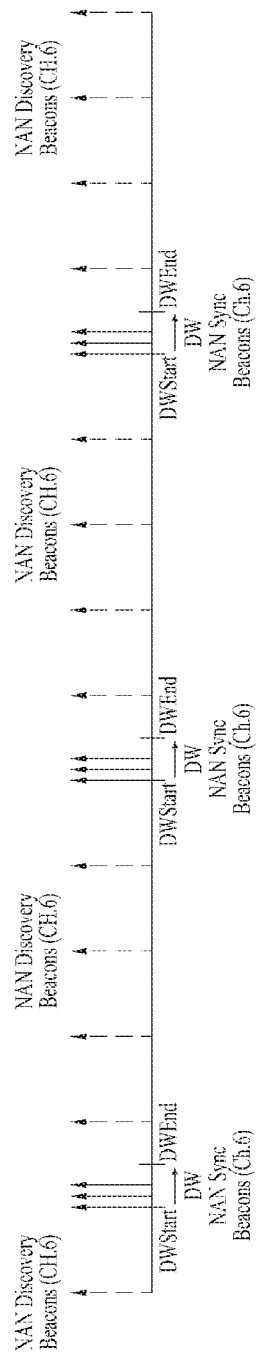
FIG. 9 is a diagram illustrating a discovery window.

FIG. 9 is a diagram illustrating a discovery window. As mentioned in the foregoing description, each NAN terminal performing a master role transmits a synchronization beacon frame within a discovery window and transmits a discovery beacon frame at the outside of the discovery window. In this case, as mentioned in the foregoing description, the discovery window can be repeated in every 512 TU. In this case, duration of the discovery window may correspond to 16 TUs. In particular, the discovery window can last during 16 TUs. In this case, for example, all NAN terminals belonging to a NAN cluster may awake at every discovery window to receive a synchronization beacon frame from a master NAN terminal. By doing so, the NAN cluster can be maintained. In this case, if all NAN terminals awake at every discovery window in a fixed manner, power consumption of the terminals may get worse. Hence, it is necessary to have a method of reducing power consumption by dynamically controlling duration of a discovery window while synchronization is maintained in a NAN cluster.

For example, as mentioned in the foregoing description, a NAN terminal may operate in 2.4 GHz band or 5 GHz band. As a different example, a NAN terminal may operate in sub 1 GHz band. For example, a NAN terminal can be configured to support IEEE 802.11ah that supports sub 1 GHz band. For example, if a NAN terminal supports 900 MHz, it may have link quality and a physical model different from link quality and a physical model in 2.4 GHz or 5 GHz.

For example, if a NAN terminal supports 900 MHz, the NAN terminal can send a signal farther and perform communication in a wider range. In this case, data communication can be performed between NAN terminals and data can be exchanged between NAN terminals. In this case, since the data exchange is performed based on the data communication, a problem may exist in efficiently managing power in the NAN terminal. In order to solve the problem, it may differently configure a method of configuring a discovery window period. FIG. 9 shows a basic structure that a synchronization beacon frame is transmitted within a discovery window and a discovery beacon frame is transmitted at the outside of the discovery window. The basic structure can also be similarly applied to a NAN terminal supporting 900 MHz band.

Figure 10:
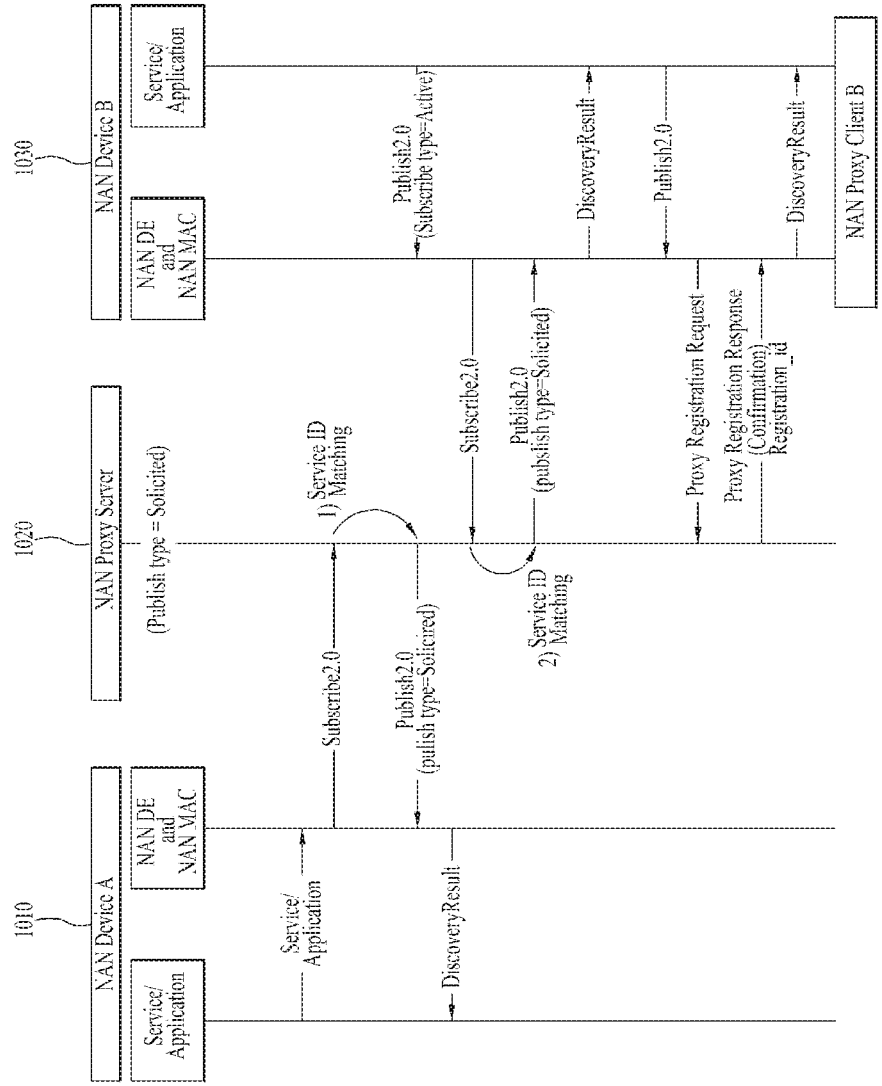
FIG. 10 is a diagram illustrating a method for a NAN terminal to register at a NAN proxy server as a NAN proxy client.

FIG. 10 is a diagram illustrating a method for a NAN terminal to register the NAN terminal at a NAN proxy server as a NAN proxy client As mentioned in the foregoing description, NAN terminals can perform data communication. A NAN terminal can receive a frame in a manner of being awaken in a discovery window. In this case, if the NAN terminal performs a procedure for performing data communication in a manner of being awaken in all discovery windows, considerable amount of power can be consumed.

Hence, in the following, a method of reducing power consumption of a NAN terminal is explained. For example, a NAN proxy terminal can be defined as a new role (concept) of the NAN terminal. For example, the NAN proxy terminal may correspond to a NAN proxy server or a NAN proxy client. In this case, the NAN proxy server can perform a procedure for performing data communication on behalf of the NAN proxy client. For example, the NAN proxy server can perform publish and/or subscribe on behalf of the NAN proxy client. More specifically, the NAN proxy server can provide information, which is provided to perform data communication with a different NAN terminal, to other NAN terminals on behalf of the NAN proxy client. In particular, the NAN proxy server can perform the procedure for performing data communication on behalf of the NAN proxy client to reduce power consumption of the NAN proxy client.

For example, the NAN proxy server may correspond to a terminal not sensitive to power consumption. And, the NAN proxy client may correspond to a terminal operating based on low power. In this situation, similar to a legacy NAN terminal, if the NAN proxy client awakes in every discovery window, since the NAN proxy client consumes a considerable amount of power, it may be difficult to use the NAN proxy client. Hence, it may make a terminal not sensitive to power consumption perform a procedure for performing data communication on behalf of the NAN proxy client to reduce power consumption and efficiently perform the data communication.

In this case, in order for the NAN proxy server to perform the procedure for performing the data communication on behalf of the NAN proxy client, it is necessary for the NAN proxy server to obtain information on the NAN proxy client. To this end, the NAN proxy client can be registered at the NAN proxy server. In the following, a method of registering the NAN proxy client at the NAN proxy server is described.

More specifically, a NAN terminal playing a role of a proxy server may correspond to a NAN proxy server. In this case, for example, the NAN proxy server can provide other NAN terminals with information indicating that the NAN proxy server is able to operate as a NAN proxy server. For example, the NAN proxy server can include information on a NAN proxy server role in a broadcasted message. In this case, other NAN terminals can identify the NAN proxy server based on the broadcasted message. And, for example, the NAN proxy server can provide other NAN terminals with the information on the NAN proxy server role using a publish message, by which the present invention may be non-limited.

If NAN terminals 1010/1030 recognize the NAN proxy server, the NAN terminals 1010/1030 can transmit a subscribe message to the NAN proxy server 1020 to find out a service of the NAN proxy server 1020.

More specifically, as mentioned in the foregoing description, the NAN terminals 1010/1030 may have a layered structure. In this case, for example, a service/application layer of a first NAN terminal (NAN device A, 1010) can provide a discovery engine (DE) and NAN MAC of the first NAN terminal 1010 with a subscribe method.

In this case, for example, primitives of the subscribe method provided to the NAN DE and the NAN MAC layers by the service/application layer can be represented as Table 3 in the following. In particular, the service/application layer can provide information on Table 3 to the NAN DE and the NAN MAC layers. More specifically, the service/application layer can provide information on a service name, service specific information, and a configuration parameter to be searched by a NAN terminal to the NAN DE and the NAN MAC layers.

And, other additional information can also be included in the primitives of the subscribe method, by which the present invention may be non-limited.

TABLE 3

Subscribe(service_name, service_specific_info, configuration_parameters)

- service_name:
    UTF-8 name string which identifies the service/application
- service_specific_info:
    Sequence of values which further specify the published service beyond the service name
- configuration_parameters
    ○ Subscribe type
        Active
    ○ Query period
        Recommended periodicity of query transmissions
    ○ Time to live
        The instance of the Subscribe function can be commanded to run for a given time interval or until the first DiscoveryResult event Subsequently, the first NAN terminal 1010 can transmit a subscribe message to the NAN proxy server 1020. In particular, the first NAN terminal 1010 can transmit the subscribe message to the NAN proxy server 1020 based on the subscribe method as an active subscribe.

Subsequently, when the NA proxy server 1020 replies to the subscribe message, the NAN proxy server 1020 can transmit a publish message to the first NAN terminal 1010 by matching a service ID with a service capable of being provided by the NAN proxy server 1020. In this case, a Publish Type of the publish message may correspond to Solicited.

In this case, for example, the service/application layer of the NAN proxy server 1020 can provide a publish method to the NAN DE and NAN MAC layers of the NAN proxy server 1020. In this case, for example, primitives of the publish method can be represented as follows.

In particular, the service/application layer can provide information on Table 4 to the NAN DE and the NAN MAC layers. More specifically, the service/application layer can provide information on a service name, service specific information, and a configuration parameter supported by the NAN proxy server 1020 to the NAN DE and the NAN MAC layers.

In this case, Publish type information can be included in configuration information to indicate that solicited transmission is performed. And, Solicited transmission type information can also be included in the configuration information to indicate whether or not the solicited transmission corresponds to unicast transmission or broadcast transmission. And, Time to live information can be included in the configuration information as information on time during which a publish function is performed. And, Event conditions information can be included in the configuration information to indicate whether or not an event is generated.

And, other additional information can also be included in the primitives of the publish method, by which the present invention may be non-limited.

TABLE 4

Publish( service_name, service_specific_info, configuration_parameters )

- service_name:
    UTF-8 name string which identifies the service/application
- service_specific_info:
    Sequence of values which should be conveyed to the Discovery Engine of a NAN Device that has invoked a Subscribe method corresponding to this Publish method.
- configuration_parameters
    ○ Publish type:

TABLE 4-continued

Publish( service_name, service_specific_info, configuration_parameters )

Solicited transmissions only
    ○ Solicited transmission type:
        Determines whether a solicited transmission is a unicast or a broadcast transmission
    ○ Time to live:
        The instance of the Publish function can be commanded to run for a given time interval or for one transmission only
    ○ Event conditions:
        Determines when Publish related events are generated. Events can be requested to be generated on each solicited transmission. Alternatively, no events are expected.

Subsequently, if the first NAN terminal 1010 receives a publish message, the NAN DE and the NAN MAC layers of the first NAN terminal 1010 can provide a discovery result as an event to the service/application layer of the first NAN terminal 1010. By doing so, the first NAN terminal 1010 can complete the service discovery of the NAN proxy server 1020.

In this case, for example, primitives of the discovery result event can be represented as Table 5 in the following.

More specifically, the NAN DE and the NAN MAC layers can provide the service/application layer with the discovery result event including subscribe id information that identifies a subscribe function, service_specific_info information corresponding to specific service information supported by the NAN proxy server, publish_id information corresponding to publish ID information, and Address information corresponding to address information of the proxy server.

And, other additional information can also be included in the primitives of the discovery result event, by which the present invention may be non-limited

TABLE 5

DiscoveryResult( subscribe_id, service_specific_info, publish_id, address )

- subscribe_id:
    As originally returned by the instance of the Subscribe function
- service_specific_info:
    Sequence of values which were decoded from a frame received from the Proxy server
- publish_id:
    Identifier for the instance of the published service on a remote Proxy server
- Address:
    NAN Interface Address of the Proxy Server And, the second NAN terminal (NAN device B, 1030) can discover a service of the NAN proxy server 1020 based on a method identical to the method of the first NAN terminal 1010. In this case, for example, the service discovery on the NAN proxy server 1020 can be individually performed by each of the NAN terminals 1010/1030.

In this case, for example, having completed the service discovery on the NAN proxy server 1020, a service/application layer of the second NAN terminal 1030 can provide a publish method to NAN DE and NAN MAC layers of the second NAN terminal 1030.

In this case, for example, primitives used for the second NAN terminal 1030 to register at the NAN proxy server can be defined as Table 6 and Table 7 in the following. More specifically, the service/application layer of the second NAN terminal 1030 can provide information on proxy registration to the NAN DE and the NAN MAC layers of the second NAN terminal 1030 according to Table 6 and Table 7 as a publish method. In particular, the second NAN terminal 1030 can provide the information on the proxy registration to the NAN DE and the NAN MAC layers of the second NAN terminal 1030 by reusing a legacy publish method and a subscribe method. In this case, for example, when the legacy publish method and the subscribe method are reused, information for registering at the proxy server rather than information of the second NAN terminal for publishing the second NAN terminal 1030 can be included in a service_specific_info field. In particular, the second NAN terminal 1030 may use a method of including the information on the registration by using the legacy publish method and the subscribe method formats as it is.

TABLE 6

Publish (service_name, service_specific_info, configuration_parameters )

- service_name:
    UTF-8 name string which identifies the service/application
- service_specific_info:
    Sequence of values which should be conveyed to the Discovery Engine of a NAN Device that has invoked a Subscribe method corresponding to this Publish method.
- configuration_parameters
    ○ Publish type:
        Solicited transmissions only and Unsolicited transmission only
    ○ Solicited transmission type:
        Determines whether a solicited transmission is a unicast or a broadcast transmission
    ○ Announcement period:
        Recommended periodicity of unsolicited transmissions
    ○ Time to live:
        The instance of the Publish function can be commanded to run for a given time interval or for one transmission only
    ○ Event conditions:
        Determines when Publish related events are generated. Events can be requested to be generated on each solicited transmission. Alternatively, no events are expected.

TABLE 7

Subscribe ( service_name, service_specific_info, configuration_parameters )

- service_name:
    UTF-8 name string which identifies the service/application
- service_specific_info:
    Sequence of values which should be conveyed to the Discovery Engine of a NAN Device that has invoked a Subscribe method corresponding to this Publish method.
- configuration_parameters
    ○ Subscribe type:
        Determines the type of Subscribe as follows
            Passive: Passive: NAN device can passively subscribe to internal NAN DE.
            Active: NAN device can actively subscribe to proxy server.
    ○ Discovery range:
        Determines whether the service is searched in close proximity only or in any NAN Devices within range
    ○ Query period:
        Recommended periodicity of query transmissions
    ○ Time to live:
        The instance of the Subscribe function can be commanded to run for a given time interval or until the first DiscoveryResult eventRecommended periodicity of unsolicited transmissions As a different example, the second NAN terminal 1030 can newly define and use primitives for a method called for registration. In particular, the service/application layer of the second NAN terminal 1030 can provide information on proxy registration by providing a newly defined proxy registration method to the NAN DE and the NAN MAC layers of the second NAN terminal 1030. In this case, primitives of the newly defined proxy registration method can be represented as Table 8 in the following.

TABLE 8

ProxyRegistartion(service_name,service_specific_info, configuration_parameters)

- service_name:
    UTF-8 name string which identifies the service/application
- service_specific_info:
    Sequence of values which should be conveyed to the Discovery Engine of a NAN Device that has invoked a Subscribe method corresponding to this ProxyRegistration method.
- configuration_parameters
    ○ ProxyRegistration type:
        Solicited transmissions only and Unsolicited transmission
    ○ Solicited transmission type:
        Determines whether a solicited transmission is a unicast or a broadcast transmission
    ○ Announcement period:
        Recommended periodicity of unsolicited transmissions
    ○ Time to live:
        The instance of the Publish function can be commanded to run for a given time interval or for one transmission only
    ○ Event conditions:
        Determines when ProxyRegistration related events are generated. Events can be requested to be generated on each solicited transmission. Alternatively, no events are expected.

In particular, the service/application layer of the second NAN terminal 1030 can provide a method for registering at the NAN proxy server to the NAN DE and the NAN MAC. In this case, the method may correspond to a method using a legacy publish method format and the method including information on proxy registration. And, for example, the method may correspond to a method newly defined for proxy registration, by which the present invention may be non-limited.

Subsequently, the NAN DE and the NAN MAC layers of the second NAN terminal 1030 can transmit a proxy registration request to the NAN proxy server 1020. In this case, the proxy registration request may correspond to a publish message. For example, the proxy registration request may correspond to a publish type as a service discovery frame. In this case, a service discovery attribute for the proxy registration request can be represented as Table 9 in the following.

TABLE 9

| Field | Size (Octets) | Value (Hex) | Description |
| --- | --- | --- | --- |
| Attribute ID | 1 | 0x03 | Identifies the type of NAN attribute |
| Length | 2 | Variable | Length of the following fields in the attribute. |
| Service ID* | 6 | Variable | Mandatory field that contains the hash of the Service Name. |
| Instance ID | 1 | Variable | Publish_ID or Subscribe_ID |
| Requestor Instance ID | 1 | Variable | Instance ID from the frame that triggered the transmission if available, otherwise set to 0x00. |
| Service Control | 1 | Variable | Mandatory field that defines the Service Control bitmap |
| Binding Bitmap | 0 or 2 | 0x0000 to0xFF FF | Optional field that indicates the binding of the SDA to post discovery connection attributes |
| Service Response Filter Length | 0 or 1 | Variable | An optional field and present if a service response filter is used. |
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

In this case, for example, a service ID field can be mandatorily included in fields described in the following included in the proxy registration request. In this case, the service ID field can be defined by a proxy service ID corresponding to a service provided by the NAN proxy server. And, a proxy registration request field can include information necessary for a NAN terminal to register at the NAN proxy server. In this case, for example, a service info field corresponding to a field included in the proxy registration request can include a proxy request TLV (proxy registration request TLV). In this case, the proxy request TLV can be represented as Table 10 in the following. In this case, for example, the proxy request TLV can include an availability time field indicating DW duration during which a NAN terminal awakes after being registered as a proxy client. And, the proxy request TLV can also include a service ID field corresponding to an ID of a service requested by the NAN terminal to the NAN proxy server. Besides, the proxy request TLV can also include information necessary for the NAN terminal to register at the NAN proxy server, by which the present invention may be non-limited.

In this case, for example, a service ID field may correspond to a field mandatorily included in the fields described in the following included in the proxy registration response. In this case, the service ID field can be defined by a proxy service ID corresponding to a service provided by the NAN proxy server. The proxy registration response field can also include information necessary for a NAN terminal to register at the NAN proxy server. In this case, a service info field corresponding to a field included in the proxy registration response can include a proxy response TLV (proxy registration response TLV). In this case, the proxy response TLV can be represented as Table 11 in the following. In this case, for example, the proxy response TLV can include a status indication field indicating whether or not the NAN proxy server permits the registration of a NAN terminal. In this case, for example, if the status indication field corresponds to 0, it may indicate that the NAN proxy server permits the registration of the NAN terminal. And, if the status indication field corresponds to 1 or 2, it may indicate that the registration is denied base on a different reason. And,

TABLE 10

| Field | Size (Octets) | Value (Hex) | Description |
| --- | --- | --- | --- |
| Type | 1 | Variable | Type code of the Proxy Registration Request TLV |
| Length | 2 | Variable | Length of the Proxy Registration Request TLV (not including the Type and Length fields) |
| Availability Time | 1 | Variable | Indicates bitmap for the DW Awake Duration of Proxy Client (DW could be presented from DW0 to DW15 with bitmap pattern) If bitmap bit is set as 0, Proxy Client is sleep, otherwise bitmap bit is set as 1, Proxy Client is awake, e.g., when DW awake duration is DW1 and DW2, bitmap is presented as 0110000000000000. |
| Time to live | 1 | Variable | Indicates TTL of Proxy client's service |
| Service ID | 6 | Variable | Indicates the requesting service ID |
| Instance ID | 1 | Variable | Publish_ID or Subscribe_ID |
| Requestor Instance ID | 1 | Variable | Instance ID from the frame that triggered the transmission if available, otherwise set to 0x00 |
| Service Control | 1 | Variable | Mandatory field that defines the Service Control bitmap |
| Binding Bitmap | 0 or 2 | 0x0000 to0xFF FF | Optional field that indicates the binding of the SDA to post discovery connection attributes |
| Service Response Filter Length | 0 or 1 | Variable | An optional field and present if a service response filter is used |
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

Subsequently, the NAN proxy server can transmit a proxy response to the second NAN terminal 1030 in response to the proxy request. In this case, for example, the proxy response may correspond to a publish message. For example, the proxy registration response corresponds to a service discovery frame having a publish type. In this case, for example, a service discovery attribute for the proxy registration response can be represented as the aforementioned Table 9.

for example, the proxy response TLV can include a registration ID field indicating a registration ID. And, the proxy response TLV can include a service ID field corresponding to an ID of a service provided by the NAN proxy server. Besides, the NAN proxy response TLV can include information necessary for a NAN terminal to register at the NAN proxy server, by which the present invention may be non-limited.

TABLE 11

| Field | Size (Octets) | Value (Hex) | Description |
| --- | --- | --- | --- |
| Type | 1 | Variable | Type code of the Proxy Registration Response TLV |
| Length | 2 | Variable | Length of the Proxy Registration Response TLV (not including the Type and Length fields) |
| Status indication | 1 | Variable | If set to 0, Proxy registration is accept, otherwise set to 1 is fail due to requested information not available, and set to 2 is fail due to bad request |
| Registration ID | 1 | Variable | Indicates the Registration ID of requested service |
| MAC Address of matched device | 6 | Variable | Indicates the MAC Address of service matched device on a remote NAN Device |
| Service ID | 6 | Variable | Responses the requesting service ID |
| Time to live | 1 | Variable | Indicates TTL of Proxy Server |
| Watchdog timer | 1 | Variable | Indicates Watchdog timer value |

Subsequently, if the NAN DE and the NAN MAC of the second NAN terminal 1030 receive a confirmation from the NAN proxy server, the NAN DE and the NAN MAC of the second NAN terminal 1030 can provide a discovery result event to the service/application layer. In this case, for example, if a proxy response of which the status indication field corresponds to 1 is received, it may indicate that a confirmation is completed. Subsequently, the second NAN terminal 1030 may become a NAN proxy client registered at the NAN proxy server based on the discovery result event.

A NAN terminal may become a NAN proxy client registered at the NAN proxy server via the aforementioned procedure.

As mentioned in the foregoing description, it may be able to support a mechanism for data transmission or power consumption of NAN terminals using a NAN proxy server. In this case, for example, when two NAN terminals are unable to perform communication with each other due to a distance problem, the NAN terminals can perform communication using the NAN proxy server. In addition, since it is not necessary for a NAN proxy client to wake up in every discovery window, it may be able to reduce power consumption.

In this case, the NAN terminal can perform a service discovery of the NAN proxy server by transmitting a subscribe message to the NAN proxy server. In this case, in order for the NAN terminal to transmit the subscribe message to the NAN proxy server, it is necessary to identify the NAN proxy server. In particular, it is necessary for the NAN terminal to check the existence of the NAN proxy server.

In this case, for example, the NAN proxy server can inform the NAN terminal of the existence of the NAN proxy server by publishing a service discovery frame by broadcasting the service discovery frame. In this case, the publishing may correspond to a solicited type or an unsolicited type, by which the present invention may be non-limited.

For example, in order for the NAN proxy server to inform the NAN terminal of the capability of the NAN proxy server, the NAN proxy server can add a proxy server attribute within a NAN beacon frame or a service discovery frame. In this case, among NAN terminals, which have received the NAN beacon frame or the service discovery frame including the proxy server attribute, a terminal supporting a proxy client function interprets the proxy server attribute and may be then able to check the existence of the proxy server located near the terminal.

More specifically, Table 12 shows NAN attribute information capable of being included in the beacon frame and the service discovery frame. In this case, in Table 7, an attribute ID field can be defined by a different value to indicate a different attribute. And, for example, each of the attribute information may or may not be included in the beacon frame and the service discovery frame. And, for example, specific attribute information among the attribute information can be mandatorily included (represented by "M" in the table) in the beacon frame and the service discovery frame or can be optionally included (represented by "O" in the table) in the beacon frame and the service discovery frame.

In this case, it may be able to define at least one of a proxy server attribute field and a proxy client attribute field using a reserved bit belonging to the fields of the NAN attribute information. In this case, for example, the proxy server attribute field can be included in at least one selected from the group consisting of a NAN synchronization beacon frame, a NAN discovery beacon frame, and a NAN service discovery frame. In particular, the proxy server attribute field corresponds to a field defined by the NAN proxy server to notify the existence of the NAN proxy server. The proxy server attribute field can be selectively included in each of the frames.

On the contrary, the proxy client attribute field can be selectively included in the service discovery frame. In particular, the proxy client attribute field may correspond to information transmitted by a NAN terminal based on whether or not the NAN proxy server exists and whether or not the NAN terminal becomes a NAN proxy client. Hence, the proxy client attribute field is not transmitted to a NAN beacon frame and can be transmitted in a manner of being included in a NAN service discovery window.

TABLE 12

| Attribute ID | Description | NAN Beacons | | NAN SDF |
| --- | --- | --- | --- | --- |
| | | Sync | Discovery | |
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14(TBD) | Proxy Server Attribute | YES/O | YES/O | YES/O |
| 15(TBD) | Proxy Client Attribute | NO | NO | YES/O |
| 16-220 | Reserved | NA | NA | NA |
| 221 | Vendor Specific Attribute | YES/O | YES/O | YES/O |
| 222-255 | Reserved | NA | NA | NA |

In this case, the proxy server attribute field can be configured as Table 13 in the following. More specifically, the proxy server attribute field can include a proxy server address field including address information of a NAN interface of a proxy server. And, the proxy server attribute field can include a proxy server capability field as information on capability of the NAN proxy server. In this case, a function of the NAN proxy server can be included in a bitmap form. And, an awake interval of the NAN proxy server can be represented by a value of an integer form. In this case, the integer value corresponds to a discovery window period during which the NAN proxy server is awaked. In particular, if the integer value corresponds to 1, the NAN proxy server can awake in every discovery window period. In this case, for example, since the NAN proxy server plays a role of the NAN proxy client on behalf of the NAN proxy client, it is preferable that the NAN proxy server awakes in every discovery window.

And, for example, if it is necessary to reduce power consumption of the NAN proxy server, it may change the integer value, by which the present invention may be non-limited. If the NAN proxy server provides a function of an AP STA at the same time, it may include a BSSID field as the AP STA.

TABLE 13

| Field | Size (octets) | Value | Description |
| --- | --- | --- | --- |
| Attribute ID | 1 | 0x14 | Identifies the type of NAN attribute. (TBD) |
| Length | 2 | Variable | Length of the following fields in the attribute. |
| Proxy Server Address | 6 | Variable | NAN Interface address of NAN Proxy Server |
| Proxy Server Capability | 1 | Variable | Capability of Proxy Server |
| Awake Interval | 1 | 1-255 | DW interval of this Proxy Server |
| BSSID | 6 | Variable | BSSID which is support by Proxy Service if capable. |

Figure 11:
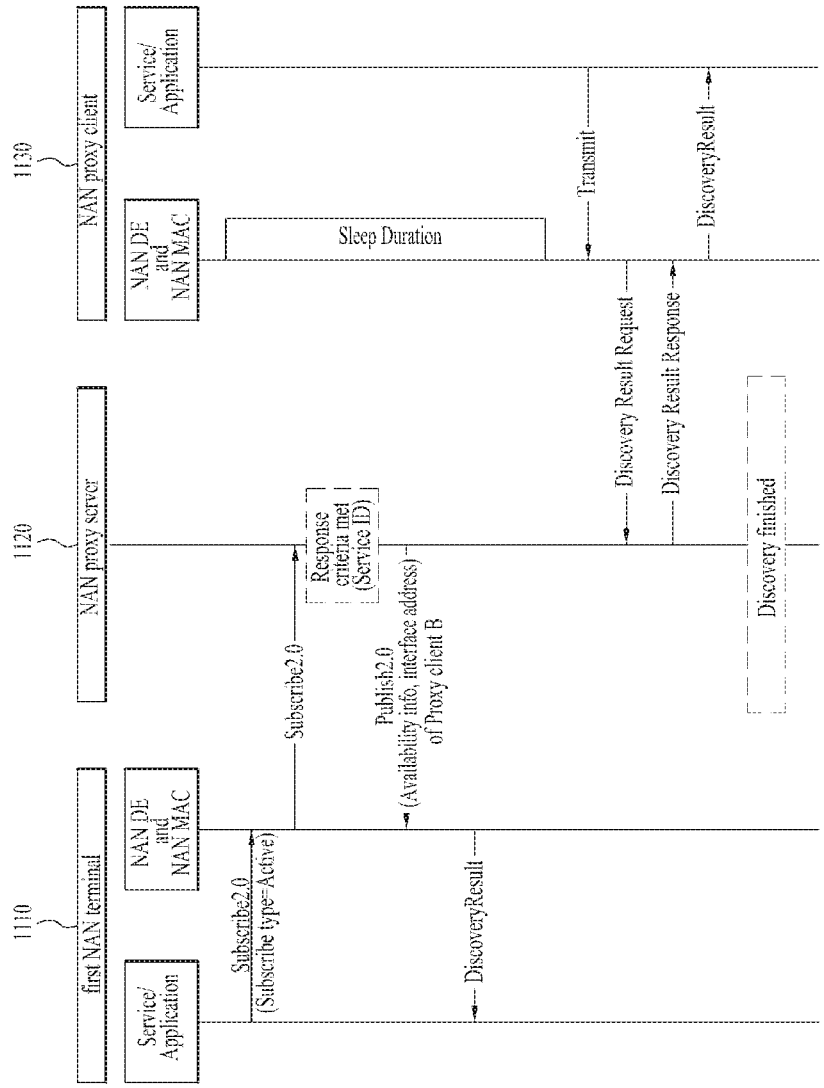
FIG. 11 is a diagram illustrating a method for a NAN proxy server to complete discovery based on a request of a NAN proxy client.

FIG. 11 is a diagram illustrating a method for a NAN proxy server to complete discovery based on a request of a NAN proxy client.

As mentioned in the foregoing description, a NAN proxy server 1120 can perform discovery on a proxy service on behalf of a NAN proxy client 1130. In this case, the NAN proxy client 1130 may be in a sleep state while the NAN proxy server 1120 performs the discovery, thereby reducing power consumption. When the NAN proxy server 1120 completes discovery for a service satisfying a criteria as a service for the NAN proxy client 1130, it is necessary for the NAN proxy server 1120 to provide a discovery result to the NAN proxy client 1130. In this case, for example, referring to FIG. 11, the NAN proxy server 1120 can provide a discovery result to the NAN proxy client 1130 based on a request of the NAN proxy client 1130.

More specifically, the NAN proxy client 1130 can maintain a sleep state for prescribed time. And, for example, the NAN proxy client 1130 may be in a state incapable of receiving a frame due to a different condition or a reason. Hence, in order to reduce an error in receiving a frame, the NAN proxy client 1130 can obtain discovery result information by sending a discovery result request to the NAN proxy server 1120.

In this case, for example, a service/application end of the NAN proxy client 1130 may call a method. In this case, the method may correspond to transmit( ). In particular, if the service/application end of the NAN proxy client 1130 calls the transmit( ) method to a NAN DE and a NAN MAC end, the NAN proxy client 1130 can transmit a discovery result request to the NAN proxy server 1120. In this case, the discovery result request may correspond to a follow-up message. A service discovery attribute for the discovery result request is shown in Table 9. In this case, a service information (Service Info) field of the service discovery attribute can be represented as Table 14 in the following in consideration of the discovery result request. In particular, the service information field can include a registration ID field corresponding to requested service ID list information and a proxy server MAC address field corresponding to a MAC address of the NAN proxy server. By doing so, the NAN proxy client 1130 can request a discovery result for a delegated service to the NAN proxy server 1120.

TABLE 14

| Field | Size (Octets) | Value (Hex) | Description |
|---|---|---|---|
| Type | 1 | Variable | Type code of the Proxy Discovery Result Request TLV |
| Length | 2 | Variable | Length of the Proxy Discovery Result Request TLV (not including the Type and Length fields) |
| Registration ID | 1 | Variable | List of requesting service IDs |
| MAC Address of Proxy Server | 6 | Variable | Indicates the MAC Address of Associated Proxy Server |

Subsequently, the NAN proxy server 1120 can transmit a discovery result response to the NAN proxy client 1130 in response to the discovery result request. In particular, the NAN proxy server 1120 can transmit a discovery result to the NAN proxy client 1130 based on the request of the NAN proxy client 1130.

In this case, for example, the discovery result response may also correspond to a follow-up message. A service discovery attribute for the discovery result response is shown in Table 9. In this case, a service information (Service Info) field of the service discovery attribute can be represented as Table 15 in the following in consideration of the discovery result response.

In Table 9, a proxy registration request may correspond to a publish message. For example, the proxy registration request may correspond to a service discovery frame including a type of publish. In this case, for example, a service discovery attribute for the proxy registration request can be represented as Table 9 in the following. In this case, a service information field of the service discovery attribute can be represented as Table 15 in the following in consideration of the discovery result response.

In this case, for example, the service information field can include a MAC address of service matched device field corresponding to an MAC address of a matched device for a proxy service. In particular, the NAN proxy server 1120 can provide address information on a NAN terminal matched with a delegated service to the NAN proxy client 1130.

And, for example, the service information field can include an instance ID (instance_ID) field. In this case, an instance ID corresponds to a value returned by a subscribe/publish function and the instance ID can be differently configured according to a discovery method type for a discovered service. In particular, the instance ID can be differently configured according to whether the discovery method type corresponds to publish or subscribe. And, for example, the service information field can include an instance ID remote (instance_ID_remote) field. The instance ID remote field can be differently configured according to a discovery method type for a discovered remote NAN terminal. For example, if an instance ID corresponds to publish, the instance ID remote field may correspond to subscribe. On the contrary, if an instance ID corresponds to subscribe, the instance ID remote field may correspond to publish. And, an availability information field can include information on discovery window awake duration of the NAN proxy client. In this case, for example, when a TTL (time to live) length of a remote NAN terminal is longer than a period of a discovery window 0, the same bitmap information can also be applied to an exceeded part. And, the service information field can include a connection capability bitmap field. In this case, the connection capability bitmap field corresponds to information indicating connection capability information of a NAN terminal and can be represented as Table 16 in the following.

TABLE 15

| Field | Size (Octets) | Value (Hex) | Description |
|---|---|---|---|
| Type | 1 | Variable | Type code of the Proxy Deregistration Request TLV |
| Length | 2 | Variable | Length of the Proxy Deregistration Request TLV (not including the Type and Length fields) |
| Registration ID | 1 | Variable | Indicates the Registration ID of requested service |
| MAC Address of service matched device | 6 | Variable | Indicates the MAC Address of service matched device on a remote NAN Device |
| Instance_ID | xx | xx | As originally returned by the instance of the Subscribe/Publish function, Discovery method type of requested service for Registration ID (instance ID is differently configured according to whether discovery method type corresponds to publish of subscribe) |
| Service specific info. | xx | xx | Sequence of values which were decoded from a frame received from the Publisher |
| Instance_ID_remote | xx | xx | Identifier for the instance of the published/subscribed service on a remote NAN Device, Discovery method type of requested service for Registration ID (Instance_ID_remote is differently configured according to whether discovery method type corresponds to publish or subscribe) |

TABLE 15-continued

| Field | Size (Octets) | Value (Hex) | Description |
|---|---|---|---|
| TTL | xx | xx | Time to Live value of the published service on a remote NAN Device |
| Connection Capability bitmap | xx | xx | A set of parameters indicating NAN Device's connection capabilities, as defined in table 16. |
| Availability info | xx | xx | Indicates bitmap for the DW Awake Duration of Proxy Client on a remote NAN2 device (DW could be presented from DW0 to DW15). |

TABLE 16

| Bit(s) | Information | Notes |
|---|---|---|
| 0 | Wi-Fi Direct | The Wi-Fi Direct field shall be set to 1 if the NAN Device supports Wi-Fi Direct, and is set to 0 otherwise. |
| 1 | P2Ps | The P2Ps field shall be set to 1 if the NAN Device supports Wi-Fi Direct Services, and is set to 0 otherwise. |
| 2 | TDLS | The TDLS field shall be set to 1 when the NAN Device supports TDLS, and is set to 0 otherwise. |
| 3 | WLAN Infrastructure | The WLAN Infrastructure field shall be set to 1 when the NAN Device currently connect to an WLAN Infrastructure AP, and is set to 0 otherwise. |
| 4 | IBSS | The IBSS field shall be set to 1 when the NAN Device supports IBSS, and is set to 0 otherwise. |
| 5 | Mesh | The Mesh field shall be set to 1 when the NAN Device supports Mesh, and is set to 0 otherwise. |
| 6 | NAN Data path | - NAN Data path field shall be set to 1 when the NAN device support NAN data path, and is set to 0 otherwise. |
| 7-15 | Reserved | |

As a further different example, as shown in Table 17, the discovery result response may include a list of a plurality of discovery results. In this case, each of a plurality of the discovery results can be represented as Table 18 in the following, by which the present invention may be non-limited.

TABLE 17

| Field | Size (Octets) | Value (Hex) | Description |
|---|---|---|---|
| Type | 1 | Variable | Type code of the Proxy Deregistration Request TLV |
| Length | 2 | Variable | Length of the Proxy Deregistration Request TLV (not including the Type and Length fields) |
| Discovery results list | Variable | xx | Discovery results for matched services |

TABLE 18

| Field | Size (Octets) | Value (Hex) | Description |
|---|---|---|---|
| Registration ID | 1 | Variable | Indicates the Registration ID of requested service |
| MAC Address of service matched device | 6 | Variable | Indicates the MAC Address of service matched device on a remote NAN Device |
| Instance_ID | xx | xx | As originally returned by the instance of the Subscribe/Publish function, Discovery method type of requested service for Registration ID (instance ID is differently configured according to whether discovery method type corresponds to publish of subscribe) |
| Service specific info. | xx | xx | Sequence of values which were decoded from a frame received from the Publisher |
| Instance_ID_remote | xx | xx | Identifier for the instance of the published/subscribed service on a remote NAN Device. |

TABLE 18-continued

| Field | Size (Octets) | Value (Hex) | Description |
|---|---|---|---|
| | | | Discovery method type of requested service for Registration ID (Instance_ID_remote is differently configured according to whether discovery method type corresponds to publish of subscribe) |
| TTL | xx | xx | Time to Live value of the published service on a remote NAN Device |
| Connection Capability bitmap | xx | xx | A set of parameters indicating NAN Device's connection capabilities, as defined in table 16. |
| Availability info | xx | xx | Indicates bitmap for the DW Awake Duration of Proxy Client on a remote NAN2 device (DW could be presented from DW0 to DW15). |
| etc | xx | xx | |

And, for example, since it is able to configure a format of a higher rank using a combination of the parameters/fields included in Tables 14 to 18, the present invention is not restricted to the proposed method. In addition, since a value of the "xx" part is applied according to the necessity, the value is not restricted to a specific value.

Figure 12:
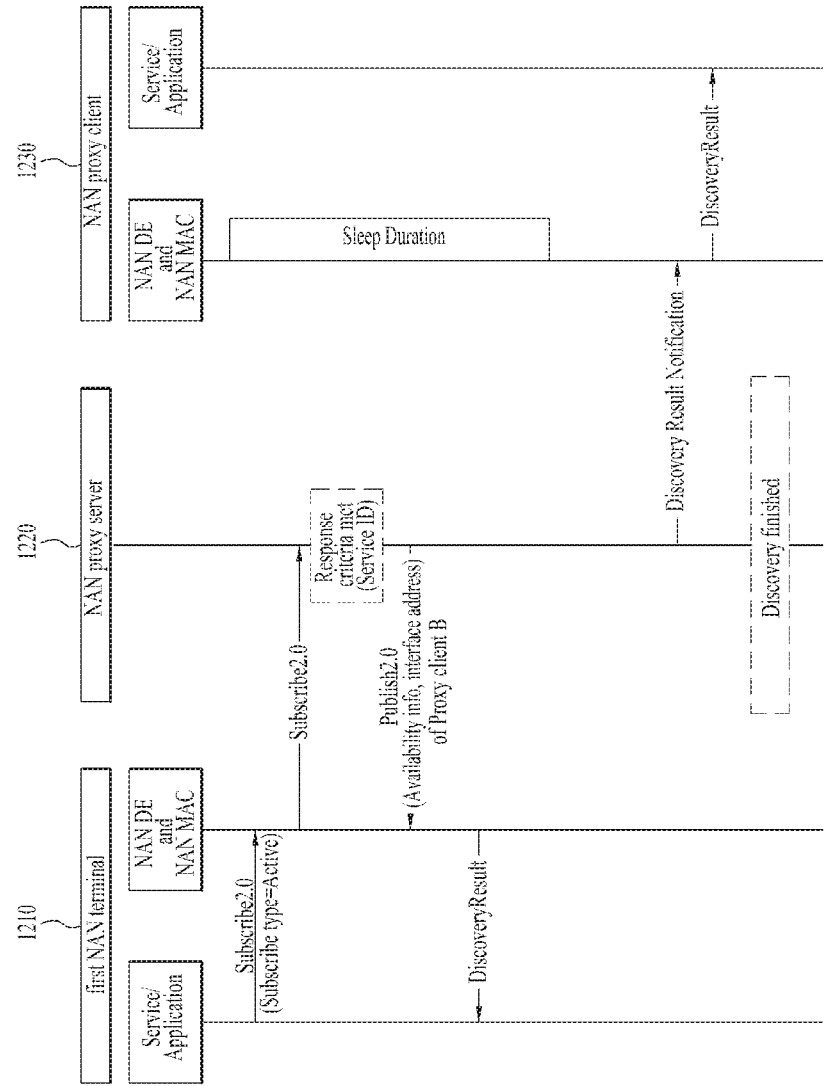
FIG. 12 is a diagram illustrating a method for a NAN proxy server to send a discovery result notification to a NAN proxy client.

FIG. 12 is a diagram illustrating a method for a NAN proxy server to send a discovery result notification to a NAN proxy client.

Referring to FIG. 12, a NAN proxy server 1220 can transmit a discovery result notification to a NAN proxy client 1230. For example, the NAN proxy server 1220 may be aware of information on sleep duration of the NAN proxy client 1230. Hence, the NAN proxy service 1220 can transmit the discovery result notification to the NAN proxy client 1230 without receiving a discovery request from the NAN proxy client 1230. In particular, the NAN proxy server 1220 can transmit the discovery notification to the NAN proxy client 1230 at the timing at which the NAN proxy client is woke.

In this case, for example, the discovery result notification may also correspond to a follow-up message. IN this case, information included in the discovery result notification can include the same information shown in the Tables 15 to 19. In particular, since the NAN proxy server 1220 provides a discovery result for a delegated proxy service, the discovery result notification can include information identical to the aforementioned discovery result response.

And, for example, when the NAN proxy server 1220 performs an advertisement operation or a discovery operation of a delegated service, if the NAN proxy server discovers a NAN terminal providing a matched service, the NAN proxy server 1220 can transmit a discovery result notification to the NAN proxy client 1230.

In this case, for example, if the NAN proxy client 1230 is unavailable at the timing at which the discovery result notification is transmitted, the NAN proxy server 1220 waits until the NAN proxy client 1230 is available and then transmits the discovery result notification. In this case, for example, the NAN proxy client 1230 may be in a sleep state or may inform the NAN proxy server 1220 of an unavailable period via availability information at the time of registering at the NAN proxy server 1220.

And, for example, if a matched service is unavailable at the timing at which the NAN proxy server 1220 transmits the discovery result notification, the NAN proxy server 1220 may not transmit the discovery notification to the NAN proxy client 1230. In this case, for example, the matched service may be unavailable when TTL is terminated.

As a different example, the NAN proxy server 1220 can transmit the discovery result notification to the NAN proxy client 1230 irrespective of whether or not a service is unavailable. In particular, the NAN proxy client 1230 can receive the discovery result notification irrespective of whether or not a service is unavailable. Subsequently, the NAN proxy client 1230 directly checks whether or not a service is available and may be then able to operate.

Figure 13:
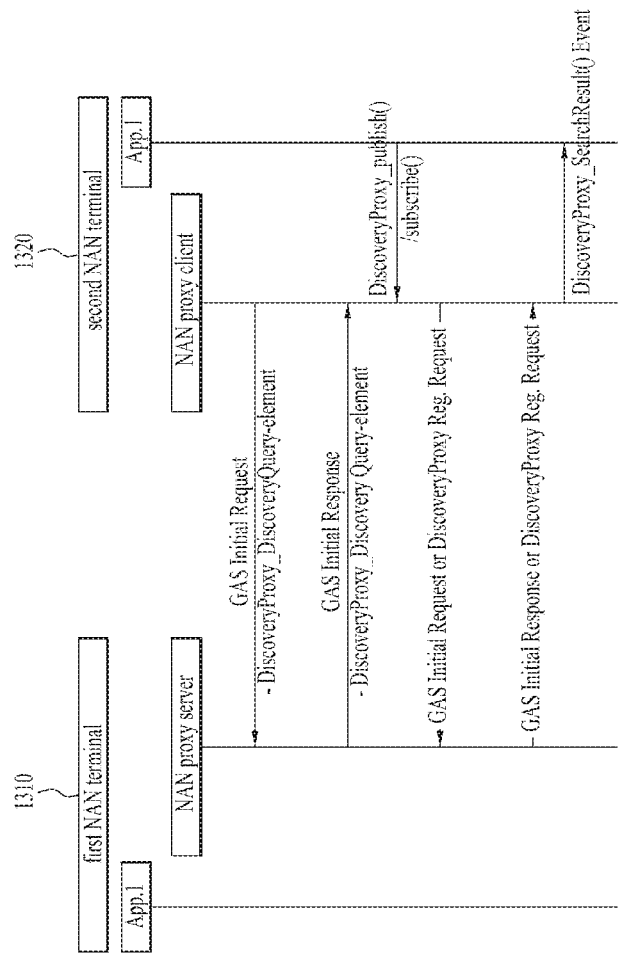
FIG. 13 is a diagram illustrating a method of performing service discovery using a GAS (generic advertisement service) protocol.

FIG. 13 is a diagram illustrating a method of performing service discovery using a GAS (generic advertisement service) protocol.

A NAN proxy server can perform a service discovery procedure by exchanging a service discovery frame with a NAN proxy client in a discovery window. In this case, for example, the NAN proxy server and the NAN proxy client can perform the service discovery procedure using a GAS frame based on a GAS protocol.

Referring to FIG. 13, a first NAN terminal 1310 may correspond to a NAN terminal playing a role of a NAN proxy server. And, a second NAN terminal 1320 may correspond to a NAN terminal playing a role of a NAN proxy client. In this case, for example, the second NAN terminal 1320 can transmit a GAS initial request frame to discover a proxy service for the NAN proxy server in a NAN discovery window (DW) section. In this case, the transmission may correspond to broadcast transmission or unicast transmission. In this case, for example, the GAS initial request frame can include an address 1 (A1) field, an address 2 (A2) field, and an address 3 (A3) field. In this case, A1 corresponds to a broadcast address or a unicast address, A2 corresponds to an address of a transmission device, and A3 can be configured by a NAN cluster ID. In particular, an address value can be configured in consideration of a frame exchanged for a discovery procedure exchanged by NAN terminals playing a role of the NAN proxy server and the NAN proxy client. In this case, if a service ID is matched with a service name based on the GAS initial request frame, the first NAN terminal 1310 can transmit a GAS initial response frame. In this case, for example, the first NAN terminal 1310 can transmit the GAS initial response frame in a DW section identical to the DW section in which the GAS initial request frame is transmitted. And, for example, the first NAN terminal 1310 can transmit the GAS initial response frame in a DW section immediately after the DW section in which the GAS initial request frame is transmitted. In particular, the discovery procedure performed by the NAN proxy server and the NAN proxy client can be performed based on a GAS frame.

In this case, for example, the GAS frame can be restrictively applied to a discovery procedure for a proxy service only in a relation between the NAN proxy server and the NAN proxy client. More specifically, the NAN proxy server and the NAN proxy client may correspond to a single role for a NAN terminal. In particular, a NAN terminal may perform a different role rather than the NAN proxy server or the NAN proxy client. For example, NAN terminals may form a NAN data link to exchange data irrespective of the NAN proxy server/client role and may be able to play a role in exchanging data.

In this case, for example, a NAN terminal can exchange information and data using the aforementioned service discovery frame. Yet, since the NAN terminal is able to play not only a role of the NAN proxy server/client but also a different role, it is necessary to define a usage of the service discovery frame used by the NAN terminal. Hence, the service discovery frame can include additional information for defining the usage of the service discovery frame based on a role of the service discovery frame.

In this case, for example, when the NAN terminal plays a role of the NAN proxy server/client, it may use a GAS frame to identify a frame for a NAN proxy service. In particular, the NAN terminal may use the GAS frame as a dedicated frame for providing a NAN proxy service.

More specifically, if the second NAN terminal 1320 transmits a GAS initial request frame to the first NAN terminal 1310, the first NAN terminal 1310 is able to know that the GAS initial request frame corresponds to a request for a discovery procedure for a NAN proxy service. In particular, having received the GAS initial request frame, the first NAN terminal 1310 is able to know that the GAS initial request frame corresponds to a frame for a discovery procedure for a NAN proxy service without checking additional information in a frame. For example, if the first NAN terminal receives a service discovery frame from the second NAN terminal 1320, the first NAN terminal can check attribute information on the frame based on information included in the service discovery frame. For example, the first NAN terminal 1310 can check a role of the second NAN terminal 1320 and attribute information on a frame based on a value indicated by a NAN attribute information field based on Table 12. On the contrary, if the first NAN terminal 1310 receives a GAS initial request frame, the first NAN terminal 1310 is able to know that the second NAN terminal 1320 plays a role of a NAN proxy client without additional information. And, the first NAN terminal is able to check that the GAS initial request frame corresponds to a frame for a NAN proxy service discovery procedure. By doing so, NAN terminals can perform filtering on a NAN proxy service and reduce unnecessary traffic.

In this case, for example, the GAS initial request frame used for performing a NAN proxy service discovery procedure can be represented as Table 19 in the following. In this case, a query request field of an ANQP (Access Network Query Protocol) of the GAS initial request frame can include vendor specific content. In this case, the vendor specific content is shown in Table 20 in the following.

TABLE 19

GAS Initial Request Action Frame

| | | | | ANQP Query Request Field | | | | |
|---|---|---|---|---|---|---|---|---|
| Category | Action | Dialog Token | Advertisement Protocol IE | Query Request Length | Info ID | Length | OI | Vendor Specific Content |
| 1 | 1 | 1 | variable | 2 | 2 | 2 | variable | Variable: see below |

TABLE 20

ANQP Query Request Vendor-specific Content

| | | | ANQP Query Request Vendor-specific Content Content TLV | | |
|---|---|---|---|---|---|
| OUI Subtype | Service update Indicator | Length | Service Type | Service Transaction ID | Query Data |
| 1 | 2 | 2 | variable | 1 | variable |

In this case, the vendor specific content (or, ANQP Query Request Vendor-specific Content) can include a query information (query data) field. For example, it may define "DiscoveryProxy_Discovery Query-element" in the query information field and use information shown in Table 21 in the following by including the information in the query information field. And, information of the same format can also be included in a query information field of ANQP Query Request Vendor-specific Content for a GAS initial response frame. In particular, information related to a NAN proxy service can be defined and used in the query information field.

TABLE 21

- Service ID/Service Name
    ex) (all or a part of) hash value for a service name such as org.wi-fi.NAN2.discoveryproxy.server or Service Name(string), index...
    - Further Availability(FA) Map Attribute or (FA capability and FA schedule )
    - Proxy server capability
    - Proxy client capability
    - Etc.

In this case, for example, a NAN terminal playing roles of a NAN proxy server and a NAN proxy client can perform procedures related to a NAN proxy service using a GAS frame.

For example, when a NAN proxy client registers at a NAN proxy server to delegate a service, the NAN proxy client may use a GAS frame. In this case, for example, if ANQP Query Request Vendor-specific Content shown in Table 19 is defined, a sub action field can be newly defined. For example, when the NAN proxy client transmits a GAS initial request frame to the NAN proxy server, it may be able to configure a sub item to be identified using the sub action field. In this case, it may define "DiscoveryProxy_xxx Query-element" in the sub action field according to item distinction to make the sub action field to be used as a pair.

As a different example, in Table 19, it may newly define a field for a NAN public action in the category field and lower actions for discovery proxy can be used in an action field corresponding to a next field of the category field.

In this case, for example, if a specific action corresponds to a registration request, "DiscoveryProxy_RegistrationReq Query-element" can be defined in the sub action field. In this case, the query information field shown in Table 19 can include information necessary for a NAN proxy server to register publish/subscribe information for a delegated service. And, for example, the query information field can further include sleep information (Sleep Info) indicating an awake period in a bitmap form. And, for example, the query information field can further include further availability (FA) map attribute information or FA capability and FA schedule information.

And, for example, if a specific action corresponds to a registration response, DiscoveryProxy_RegistrationRes Query-element" can be defined in the sub action field. In this case, the query information field shown in Table 20 can include a registration ID, status, and information on proxy server capability. And, for example, the query information field can further include discovery window information of a NAN proxy server as information on a discovery window which is slept or awaked. And, for example, the query information field can further include further availability (FA) map attribute information or FA capability and FA schedule information.

And, for example, if a specific action corresponds to a deregistration request, "DiscoveryProxy_DeregistrationReq Query-element" can be defined in the sub action field. In this case, the query information field shown in Table 20 can include information on a registration ID. And, for example, the query information field can further include further availability (FA) map attribute information or FA capability and FA schedule information.

And, for example, if a specific action corresponds to a deregistration response, DiscoveryProxy_DeregistrationRes Query-element" can be defined in the sub action field. In this case, the query information field shown in Table 20 can include information on a registration ID and a status. And, for example, the query information field can further include further availability (FA) map attribute information or FA capability and FA schedule information.

And, for example, if a specific action corresponds to a registration update request, "DiscoveryProxy_Registration Update Request Query-element" can be defined in the sub action field. In this case, the query information field shown in Table 20 can include a registration ID, a client's service/device status, and discovery window updates information. And, for example, the query information field can further include further availability (FA) map attribute information or FA capability and FA schedule information.

And, for example, if a specific action corresponds to a registration update response, "DiscoveryProxy_Registration Update Response Query-element" can be defined in the sub action field. In this case, the query information field shown in Table 20 can include a registration ID, a server status, and discovery window update information. And, for example, the query information field can further include further availability (FA) map attribute information or FA capability and FA schedule information.

And, for example, if a specific action corresponds to a discovery result request, "DiscoveryProxy_Discovery result Request Query-element" can be defined in the sub action field. In this case, the query information field shown in Table 20 can include information on a registration ID. And, for example, the query information field can further include further availability (FA) map attribute information or FA capability and FA schedule information.

And, for example, if a specific action corresponds to a discovery result response, "DiscoveryProxy_Discovery result Response Query-element" can be defined in the sub action field. In this case, the query information field shown in Table 20 can include a registration ID and information on a discovery result (subscribe_id, service_specific_info, publish_id, address). And, for example, the query information field can further include further availability (FA) map attribute information or FA capability and FA schedule information.

And, for example, if a specific action corresponds to a discovery result notification, DiscoveryProxy_Discovery result Notification Query-element" can be defined in the sub action field. In this case, the query information field shown in Table 20 can include a registration ID and information on a discovery result (subscribe_id, service_specific_info, publish_id, address). And, for example, the query information field can further include further availability (FA) map attribute information or FA capability and FA schedule information.

And, for example, if a specific action corresponds to a discovery proxy management, DiscoveryProxy_DiscoveryProxy mgmt Query-element" can be defined in the sub action field. In this case, the query information field shown in Table 20 can include information configured in a form of a request/response or information indicating a server only. And, the query information field can include cluster attribute information and time synchronization information (TSF timer). And, for example, the query information field can further include further availability (FA) map attribute information or FA capability and FA schedule information. And, for example, the cluster attribute information and the time synchronization information (TSF timer) can be included in a separate detail action frame.

In particular, a GAS frame can include information on each of NAN proxy service procedures, by which the present invention may be non-limited.

In this case, for example, the GAS frame may have a form of a GAS initial request/response frame format. Regarding this, in order to properly use the action field shown in Table 19, it may be able to define a public action frame in accordance with a detail item. In this case, for example, a public action field value can be used in a manner of being defined between 25 and 255 in Table 22 described in the following. Or, as mentioned in the foregoing description, it may define and use an internal detail action while using vendor specific corresponding to a public action field value of "9", by which the present invention may be non-limited.

TABLE 22

| Public Action field value | Description |
|---|---|
| 0 | 20/40 BSS Coexistence Management (sec 9.6.8.2 (20/40 BSS Coexistence Management frame format)) |
| 1 | DSE enablement |
| 2 | DSE deenablement |
| 3 | DSE Registered Location Announcement |
| 4 | Extended Channel Switch Announcement |
| 5 | DSE measurement request |
| 6 | DSE measurement report |
| 7 | Measurement Pilot |
| 8 | DSE power constraint |
| 9 | Vendor Specific |

TABLE 22-continued

| Public Action field value | Description |
| --- | --- |
| 10 | GAS Initial Request (sec 9.6.8.12 (GAS Initial Request frame format)) |
| 11 | GAS Initial Response (see 9.6.8.13 (GAS Initial Response frame format)) |
| 12 | GAS Comeback Request (see 9.6.8.14 (GAS Comeback Request frame format)) |
| 13 | GAS Comeback Response (see 9.6.8.15 (GAS Comeback Response frame format)) |
| 14 | TDLS Discovery Response |
| 15 | Location Track Notification |
| 16(11ad) | QAB Request frame |
| 17(11ad) | QAB Response frame |
| 18(11ae) | QMF Policy |
| 19(11ae) | QMF Policy Change |
| 20(11aa) | QLoad Request |
| 21(11aa) | QLoad Report |
| 22(11aa) | HCCA TXOP Advertisement |
| 23(11aa) | HCCA TXOP Response |
| 24(11aa) | Public Key |
| 25(11af) | Channel Availability Query |
| 26(11af) | Channel Schedule Management |
| 27(11af) | Contact Verification Signal |
| 28(11af) | GDD Enablement Request |
| 29(11af) | GDD Enablement Response |
| 30(11af) | Network Channel Control |
| 31(11af) | White Space Map Announcement |
| 32 (Ed)(#46) | Fine Timing Measurement Request |
| 33 (Ed)(#46) | Fine Timing Measurement |
| 25-255(11aa) | Reserved |

When a NAN terminal playing a role of a NAN proxy server/client exchanges information related to a proxy service using a GAS frame based on a GAS protocol, it is necessary to define an interface between a service/application layer of the NAN terminal and the GAS protocol. In particular, the service/application layer of the NAN terminal calls a method in consideration of the GAS protocol to control operations of a NAN DE and a NAN MAC.

In this case, for example, the method called by the service/application layer of the NAN terminal can be configured as shown in Tables 23 to 28 in relation to a proxy service. For example, it may be able to call methods for discovery, registration, update, deregistration, discovery result, publish, and subscribe. Yet, it may be able to configure an additional method based on a different procedure or a function, by which the present invention may be non-limited.

TABLE 23

DiscoveryProxy_Discovery( ) method

- Primitive requested to proxy client/NAN DE by app/service to discover proxy server
- DiscoveryProxy_Discovery(service name, service_specific_info, configuration_parameters)
  ○ Service_name
      UTF-8 name string which identifies the service/application
  ○ Service_specific_info
  ○ Configuration_parameters
      > Discovery_range
      > Query_period
      > Time to live
  ○ Returns
      > Proxy_discovery_ID

TABLE 24

DiscoveryProxy_Registration( ) or DiscoveryProxy_Publish( )method

- In order for app/service to register a service of the app/service to be published to a proxy server, the app/service supports primitive using GAS protocol, legacy publish/subscribe scheme.
- DiscoveryProxy_Registration(service_name, proxy_discovery_ID, matching_filter_tx, matching_filter_rx, service_specific_info, configuration_parameters)
  ○ Service_name
  ○ Proxy_discovery_ID
  ○ Matching filter tx
  ○ Matching filter rx
  ○ Service_specific_info
  ○ Configuration_paramters
      > Publish
        ● Publish type
          ○ Determines the type of Publishing as follows
            ▪ Unsolicited transmissions only
            ▪ Solicited transmissions only
            ▪ Both unsolicited and solicited transmissions
        ● Discovery range
          ○ Determines whether the service is made discoverable in close proximity only or to any NAN Devices within range
        ● Solicited transmission type
          ○ Determines whether a solicited transmission is a unicast or a multicast transmission
        ● Announcement period
          ○ Recommended periodicity of unsolicited transmissions
        ● Time to live
          ○ The instance of the Publish function can be commanded to run for a given time interval or for one transmission only
        ● Event conditions
          ○ Determines when Publish related events are generated. Events can be requested to be generated on each solicited transmission. Alternatively, no events are expected.
        ● Matching filter flag
          ○ Zero (0) if matching_filter_tx is equal to matching_filter_rx
          ○ One (1) if matching_filter_tx is not equal to matching_filter_rx
      > Publish
        ● Subscribe type

TABLE 24-continued

DiscoveryProxy_Registration( ) or DiscoveryProxy_Publish( )method

○ Determines the type of Subscribe as follows
    ■ Passive
□ ■ Active
● Discovery range
    ○ Determines whether the service is searched in close proximity only or in any NAN Devices within range
● Query period
    ○ Recommended periodicity of query transmissions
● Time to live
    ○ The instance of the Subscribe function can be commanded to run for a given time interval or until the first DiscoveryResult event
● Matching filter flag
    ○ Zero(0) if matching_filter_tx is equal to matching_filter_rx
    ○ One(1) if matching_filter_tx is not equal to matching_filter_rx
> Returns
    Registration_instance_ID

TABLE 25

DiscoveryProxy_Deregistration( ) method

- DiscoveryProxy_Deregistration(registration_ID)

TABLE 26

DiscoveryProxy_update( ) method

- if update occurs on a service delegated by proxy client, use the primitive
- DiscoveryProxy_update(registration_ID, service_specific_info, configuration_parameters)

TABLE 27

DiscoveryProxy_DiscoveryResult( ) method

- when discovery result is requested for a service delegated by proxy client, use the primitive
- DiscoveryProxy_DiscoveryResult(registration_id, status)

TABLE 28

DiscoveryProxy_Subscribe( ) method

- Similar to discoveryProxy_Publish( ), when registering at server, it is necessary to divide in a form of Publsih/Subscribe.
- If DiscoveryProxy_Registration( ) supports both of the two schemes, this method is not used.

And, for example, NAN DE and NAN MAC layer of a NAN terminal can call an event to provide information on a proxy service to a service/application layer. In this case, the event can be configured as Tables 29 to 33 described in the following in relation to a proxy service. For example, it may be able to call events for registration, update, deregistration, discovery result, and notification. Yet, it may be able to configure an additional method based on a different procedure or a function, by which the present invention may be non-limited.

TABLE 29

Registration_response(Registration_instance_ID, registration_ID, service_specific_info, address) event

- Registration_instance_ID
- registration_ID

TABLE 29-continued

Registration_response(Registration_instance_ID, registration_ID, service_specific_info, address) event

- service_specific_info
- address

TABLE 30

Deregistration_response(registration_ID, reason) event

- registration_ID
- reason

TABLE 31

Update_response(registration_ID, status) event

TABLE 32

Discovery_result_response(registration_ID, publish_id, service_specific_ info, address) event

- registration_ID
- publish_id/subscribe_id
- service_specific_info
- address
    ○ address of counterpart terminal according to publish/subscribe

TABLE 33

Figure 14:
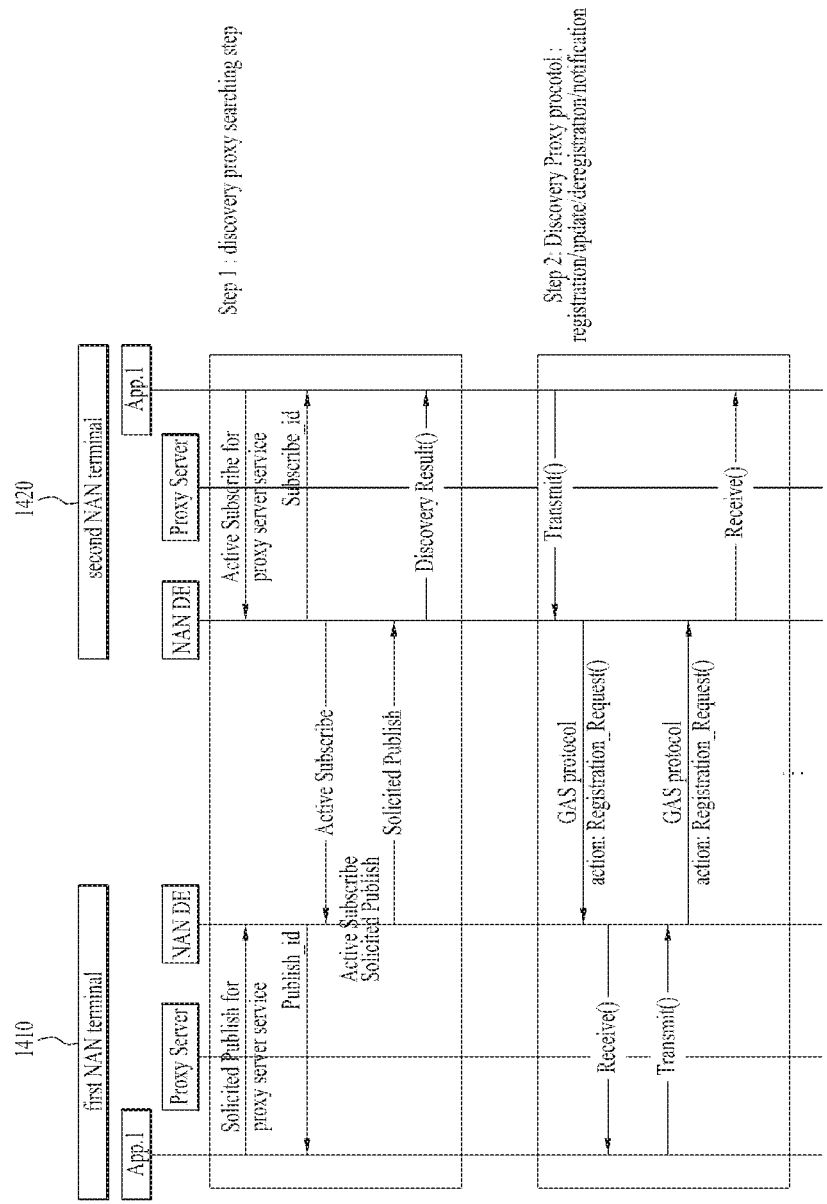
FIG. 14 is a diagram illustrating a method of providing a proxy service using a plurality of frames.

Notification(registration_ID, status, publish_id/subscribe_id, service_ specific_info, address) event FIG. 14 is a diagram illustrating a method of providing a proxy service using a plurality of frames.

When NAN terminals play a role of a NAN proxy server/client, the NAN terminals can configure a frame used in a proxy discovery step for a proxy service to be different from a frame used in a registration/update/reregistration/notification step. In particular, in relation to a proxy service, when a NAN proxy server and a NAN proxy client discover a proxy service, the discovery can be performed in a discovery window using a service discovery frame.

In this case, referring to FIG. 14, a second NAN terminal 1420 can discover a first NAN terminal 1410 using a service discovery frame. In this case, for example, the first NAN terminal 1410 corresponds to a NAN terminal playing a role of a NAN proxy server and the second NAN terminal 1420 may correspond to a NAN terminal playing a role of a NAN proxy client. In this case, if the second NAN terminal 1420 discovers the first NAN terminal 1410 using a service discovery frame, the discovery can be completed. Subsequently, the second NAN terminal 1420 can perform registration/deregistration/update/notification/delegation result request, etc. on a proxy service using a GAS protocol in unicast form using an address of the first NAN terminal 1410. In this case, for example, a step of discovering a NAN proxy server using a GAS frame can be omitted in the GAS protocol. In this case, for example, after the discovery is completed using the service discovery frame, information can be exchanged via further availability schedule negotiation. Subsequently, it may be able to exchange a GAS frame based on scheduling information.

In particular, it may be able to use a service discovery frame only when a proxy service is discovered between a NAN proxy server and a NAN proxy client. In this case, if discovery is completed, the NAN proxy server and the NAN proxy client can check address information, schedule information, and the like with each other. In this case, the NAN proxy server and the NAN proxy client can perform additional procedures (registration/deregistration/update/notification/delegation result) necessary for a proxy service using a GAS frame.

In this case, for example, since a step of discovering a matched service discovered by the NAN proxy server and the NAN proxy client may correspond to a step of initiating a procedure related to a proxy service, it may not dedicatedly use a GAS frame. Subsequently, when the NAN proxy server and the NAN proxy client perform an additional procedure based on service matching, a GAS frame can be dedicatedly used to distinguish the additional procedure from a different role or a function. In particular, when a practical procedure is performed on a proxy service, a GAS frame can be dedicatedly used to distinguish the procedure from a different role or a function.

And, for example, a primitive for a service/application layer of a NAN terminal playing a role of a NAN proxy client to transmit a GAS initial request frame for proxy service registration can be defined as Table 34 described in the following. In this case, for example, the service/application layer of the NAN terminal includes a publish ID of a proxy server in called method information to enable the NAN proxy server to be identified.

TABLE 34

DiscoveryProxy_Registration(publish_id ,service_name ,matching_filter_tx, matching_filter_rx, service_specific_info, configuration_parameters),method

- Publish_id
  ○ Publish_id of proxy server: use publish_id of proxy server obtained via service discovery frame.
- Service_name :name of service to be delegated
- Service_specific_info : additional service information on service to be delegated
- Configuration_parameters : detail parameter for service to be delegated. Information on legacy Publish/Subscribe can be included. It may apply configuration_parameters defined in Table 24 as it is.

And, for example, as shown in Table 35 in the following, a proxy registration method can be called by a registration ID and a reason, by which the present invention may be non-limited. Interfaces defined in Tables 24 to 33 can be used for other interfaces.

TABLE 35

DiscoveryProxy_Registration(registration_, reason) : method

Primitives of a service/application layer of a NAN terminal playing a role of a NAN proxy server and primitives of a NAN DE and NAN MAC layer can be defined as Table 36 in the following, by which the present invention may be non-limited.

TABLE 36

- method
  ○ Registration_response( )
  ○ Deregistration_response( )
  ○ Update_response( )
  ○ Searchresult_response( )
  ○ Notification( )
- Event
  ○ Reg_request( )
  ○ Dereg_request( )
  ○ Update_request( )
  ○ Searchresult_request( )

Figure 15:
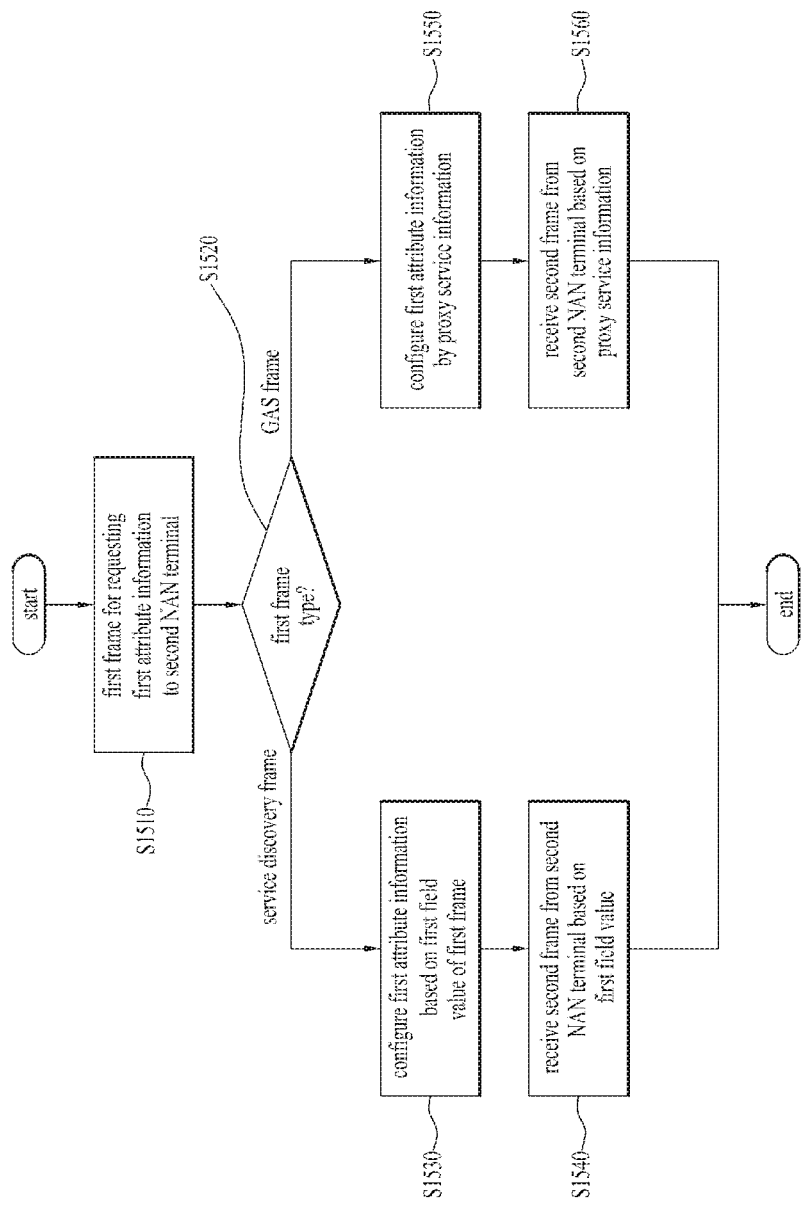
FIG. 15 is a flowchart for a method of providing a proxy service via a proxy server.

FIG. 15 is a flowchart of a method for NAN terminals to exchange a frame with each other.

A first NAN terminal can transmit a first frame to a second NAN terminal to request first attribute information [S1510]. In this case, as mentioned earlier in FIGS. 10 to 14, the first NAN terminal may correspond to a NAN terminal playing a role of a NAN proxy client. And, the second NAN terminal may correspond to a NAN terminal playing a role of a NAN proxy server. In this case, the first attribute information may correspond to the NAN attribute information mentioned earlier in Table 12. In particular, the NAN terminals can exchange a frame including different information with each other based on a role and a function. In this case, attribute information requested by a NAN terminal can be included in a first frame.

In this case, if a type of the first frame corresponds to a service discovery frame [S1520], the first attribute information can be configured based on a first field value of the first frame [S1530]. In this case, as mentioned earlier in FIGS. 10 to 14, the first field may correspond to a NAN attribute field. In particular, since a NAN terminal is able to perform not only a role of a NAN proxy but also various roles and functions, a frame transmitted by the NAN terminal can include a NAN attribute field indicating an attribute of information included in the frame. In this case, the second NAN terminal can check information requested by the first NAN terminal based on the NAN attribute field. Subsequently, the second NAN terminal can transmit a second frame to the first NAN terminal based on the NAN attribute field [S1540]. In this case, the second frame may correspond to information related to the information indicated by the NAN attribute field.

On the contrary, if the type of the first frame corresponds to a GAS frame [S1520], the first attribute information can be configured as proxy service information [S1550]. In this case, as mentioned earlier in FIGS. 10 to 14, when a NAN terminal plays a role of a NAN proxy server/client, the GAS frame can be used as a dedicated frame for a NAN proxy service. In this case, if the second NAN terminal receives the GAS frame, the second NAN terminal is able to know that the GAS frame corresponds to an information request for a proxy service. In particular, the GAS frame can be used for a proxy service irrespective of a role and a function of a NAN terminal. Hence, unnecessary information can be reduced in the first frame. In this case, the second NAN terminal can transmit a second frame based on a proxy service to the first NAN terminal [S1560]. In this case, the second frame can include information on various procedures for a proxy service.

Figure 16:
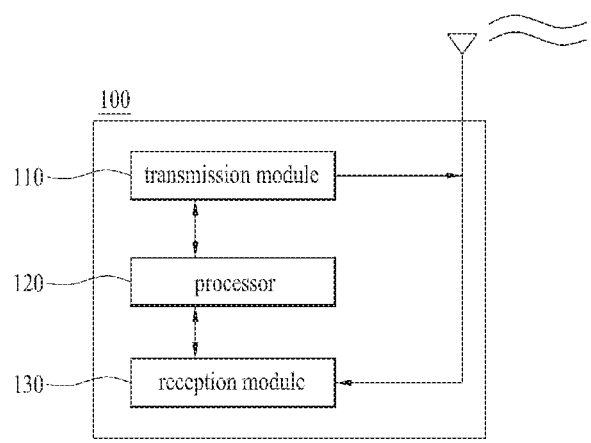
FIG. 16 is a block diagram for a terminal device.

FIG. 16 is a block diagram for a terminal device.

A terminal device may correspond to a NAN terminal. In this case, for example, the NAN terminal may correspond to a terminal playing a role of a NAN proxy server. And, the NAN terminal may correspond to a terminal playing a role of a NAN proxy client. And, the NAN terminal may correspond to a terminal performing discovery with a NAN proxy server.

In this case, the terminal device 100 can include a transmission module 110 configured to transmit a radio signal, a reception module 130 configured to receive a radio signal, and a processor 120 configured to control the transmission module 110 and the reception module 130. In this case, the terminal 100 can perform communication with an external device using the transmission module 110 and the reception module 130. In this case, the external device may correspond to a different terminal device. And, the external device may correspond to a base station. In particular, the external device may correspond to a device capable of performing communication with the terminal device 100, by which the present invention may be non-limited. The terminal device 100 can transmit and receive digital data such as contents using the transmission module 110 and the reception module 130. And, the terminal device 100 can exchange a beacon frame, a service discovery frame, and the like using the transmission module 110 and the reception module 130, by which the present invention may be non-limited. In particular, the terminal device 100 performs communication using the transmission module 110 and the reception module 130 and may be able to exchange information with an external device.

According to one embodiment of the present specification, the processor 120 of the terminal device 100 can transmit a first frame to a second NAN terminal to request first attribute information using the transmission module 110. Subsequently, the processor 120 of the terminal device 100 can receive a second frame for the first attribute information from a different NAN terminal using the reception module 130. In this case, if the first frame corresponds to a service discovery frame, the first attribute information can be configured based on a first field value of the first frame. In this case, the first filed value may correspond to a NAN attribute field. In particular, as mentioned in the foregoing description, the NAN terminal can check information included in a frame based on the NAN attribute field of the service discovery frame.

In this case, if the first frame corresponds to a GAS frame, the first attribute information can be configured as proxy service information. In particular, if the first frame corresponds to the GAS frame, a frame transmitted by a NAN terminal can include information on a proxy service irrespective of a role and a function of the NAN terminal. In particular, in a NAN system, a GAS frame can be used as a dedicated frame or a protocol for a proxy service.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

INDUSTRIAL APPLICABILITY

Although it is assumed that the present invention is applied to a NAN wireless communication system, by which the present invention may be non-limited. The present invention can be applied to various wireless systems using the same scheme.

What is claimed is:

1. A method of receiving a frame for attribute information by a first neighbor awareness networking (NAN) terminal in a wireless communication system, the method comprising:
  transmitting, to a second NAN terminal, a first frame for requesting a service; and
  receiving, from the second NAN terminal, a second frame for first attribute information related to the requested service,
  wherein a generic advertisement service (GAS) frame is used for proxy service and a service discovery frame is used for services other than the proxy service,
  wherein when the first frame is the GAS frame, the first attribute information includes information on the proxy service,
  wherein when the first frame is the service discovery frame:

the first attribute information includes information on a service configured based on a first field value of the first frame, and the first frame includes information that the service discovery frame is used for the services other than the proxy service.

2. The method of claim 1, wherein when the first frame is the GAS frame, the first attribute information includes information on the proxy service irrespective of the first field value.

3. The method of claim 1, wherein when the first frame is the GAS frame, the first frame is configured based on a GAS initial request frame format and the second frame is configured based on a GAS initial response frame format.

4. The method of claim 1, wherein the information on the proxy service is one selected from a group including proxy service discovery information, proxy service registration information, proxy service deregistration information, proxy service update information, proxy service notification information, and proxy service delegation result request information.

5. The method of claim 4, wherein the first NAN terminal is a NAN proxy client terminal and the second NAN terminal is a NAN proxy server terminal.

6. The method of claim 5, wherein after the first NAN terminal and the second NAN terminal complete discovery of the proxy service, the information on the proxy service in the group except the proxy service discovery information is exchanged between the first NAN terminal and the second NAN terminal based on the GAS frame.

7. The method of claim 1, wherein the first field of the first frame is a NAN attribute field.

8. A first neighbor awareness networking (NAN) terminal receiving a frame for attribute information in a wireless communication system, the first NAN terminal comprising:
a reception module configured to receive information from an external device;
a transmission module configured to transmit information to the external device; and
at least one processor configured to control the reception module and the transmission module,
wherein the at least one processor is configured to:
control the transmission module to transmit, to a second NAN terminal, a first frame for requesting a service,
control the reception module to receive, from the second NAN terminal, a second frame for first attribute information related to the requested service,
wherein a generic advertisement service (GAS) frame is used for proxy service and a service discovery frame is used for services other than the proxy service,
wherein when the first frame is the GAS frame, the first attribute information includes information on the proxy service,
wherein when the first frame is the service discovery frame:
the first attribute information includes information on a service configured based on a first field value of the first frame, and
the first frame includes information that the service discovery frame is used for the services other than the proxy service.

9. The first NAN terminal of claim 8, wherein when the first frame is the GAS frame, the first attribute information includes the information on the proxy service irrespective of the first field value.

10. The first NAN terminal of claim 8, wherein when the first frame is the GAS frame, the first frame is configured based on a GAS initial request frame format and the second frame is configured based on a GAS initial response frame format.

11. The first NAN terminal of claim 8, wherein the information on the proxy service is one selected from a group including proxy service discovery information, proxy service registration information, proxy service deregistration information, proxy service update information, proxy service notification information, and proxy service delegation result request information.

12. The first NAN terminal of claim 11, wherein the first NAN terminal is a NAN proxy client terminal and the second NAN terminal is a NAN proxy server terminal.

13. The first NAN terminal of claim 12, wherein after the first NAN terminal and the second NAN terminal complete discovery of the proxy service, the information on the proxy service in the group except the proxy service discovery information is exchanged between the first NAN terminal and the second NAN terminal based on the GAS frame.

* * * * *